US012748227B1

(12) United States Patent
Diawara et al.

(10) Patent No.: US 12,748,227 B1
(45) Date of Patent: Sep. 29, 2026

(54) NEUTRON BEAM MONITORING SYSTEM

(71) Applicant: UT-Battelle, LLC, Oak Ridge, TN (US)

(72) Inventors: Yacouba Diawara, Oak Ridge, TN (US); Vladislav N. Sedov, Knoxville, TN (US); Loren Lynn Funk, Knoxville, TN (US); Justin David Beal, Knoxville, TN (US); Bradley Thomas Bochenek, Knoxville, TN (US); Christopher Aaron Montcalm, Harriman, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 322 days.

(21) Appl. No.: 18/380,039

(22) Filed: Oct. 13, 2023

Related U.S. Application Data

(60) Provisional application No. 63/541,233, filed on Sep. 28, 2023, provisional application No. 63/541,235, filed on Sep. 28, 2023.

(51) Int. Cl.
*G01T 3/08* (2006.01)
*G01T 1/18* (2006.01)
*G01T 1/24* (2006.01)

(52) U.S. Cl.
CPC ................ *G01T 3/085* (2013.01); *G01T 1/18* (2013.01); *G01T 1/247* (2013.01)

(58) Field of Classification Search
None
See application file for complete search history.

(56) References Cited

U.S. PATENT DOCUMENTS

2011/0266643 A1* 11/2011 Engelmann ......... H10F 30/2235 257/E31.087

OTHER PUBLICATIONS

D.G. Chica et al., Direct thermal neutron detection by the 2D semiconductor 6 LiInP2Se6. Nature 577(7790), 346-349 (2020).
D.S. Hamm et al., Semiconducting lithium indium diselenide: Charge-carrier properties and the impacts of high flux thermal neutron irradiation. Appl. Phys. Lett. 112, 242104 (2018).

(Continued)

*Primary Examiner* — Edwin C Gunberg
(74) *Attorney, Agent, or Firm* — Lempia Summerfield Katz LLC

(57) ABSTRACT

A neutron monitoring system includes an entrance window that enables neutrons to penetrate the system while attenuating some undesired signals and/or radiation. A neutron reactive medium integrated with the entrance window functions as a neutron conversion layer that transform one or more neutron strikes against the reactive media to carrier signals that represents a neutron incidence. Semiconductor junctions absorb the carrier signals creating electron-hole pairs that have drift rates in a sub-nanosecond charge transit range and render pulses in response to each neutron detection. Neutron reactive layers serve as a cathode in a two parallel plates avalanche chamber design. The charged particles are converted into primary electrons through a gas medium and amplified by an internal gas multiplication effect for the registration of individual neutrons. A neutron registration circuit amplifies and conditions the pulses to record intensity measurements and localization measurements.

15 Claims, 18 Drawing Sheets

(56) References Cited

OTHER PUBLICATIONS

E. Herrera et al., LISe pixel detector for neutron imaging. Nucl. Instrum. Methods Phys. Res., Sect. A 833, 142-148 (2016).
Lehmann et al., Improved lifetime of microchannel-plate PMTs. Nucl. Instrum. Methods Phys. Res., Sect. A 766, 138-144 (2014).
M. Klein, C.J. Schmidt, CASCADE, neutron detectors for highest count rates in combination with ASIC/FPGA based readout electronics. Nucl. Instrum. Methods Phys. Res., Sect. A 628(1), 9-18 (2011).
Maity, T.C. Doan, J. Li, J.Y. Lin, H.X. Jiang, Realization of highly efficient hexagonal boron nitride neutron detectors. Appl. Phys. Lett. 109, 072101 (2016).
Ordela "Position Sensitive Neutron Detectors," Oak Ridge Detector Laboratory, 2 pages.
Ordela "Series 4000N Thin Beam Monitors" Oak Ridge Detector Laboratory, 1 page.
Schillinger et al., A new fast and large area neutron detector using a novel image plate readout technique. App. Rad. Isotopes 61, 451-454 (2004).
W.B. Feller, R.G. Downing, P.L. White, Neutron field imaging with microchannel plates. Proc. SPIE 4141, 291 (2000).

* cited by examiner

Fig. 2A
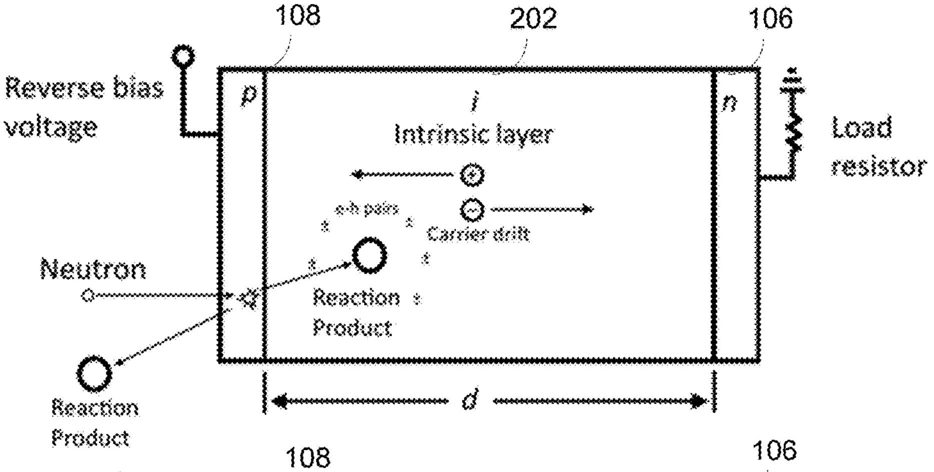
Fig. 2B
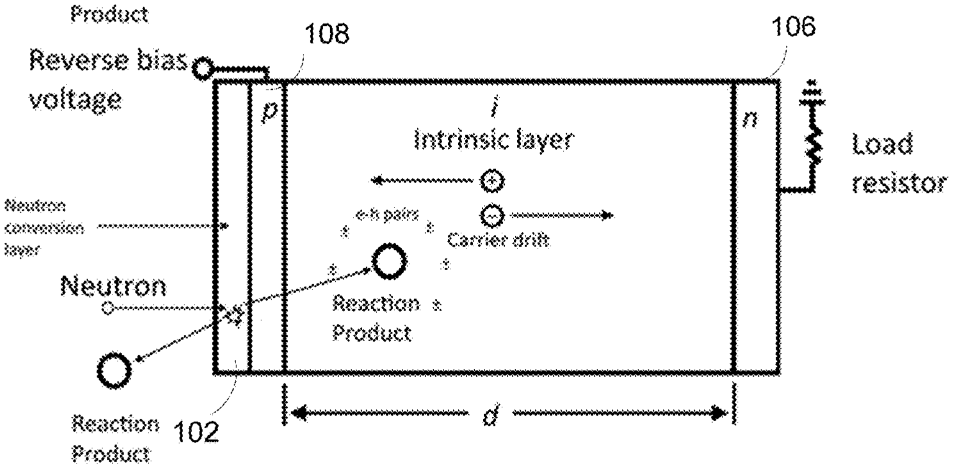
Fig. 2C
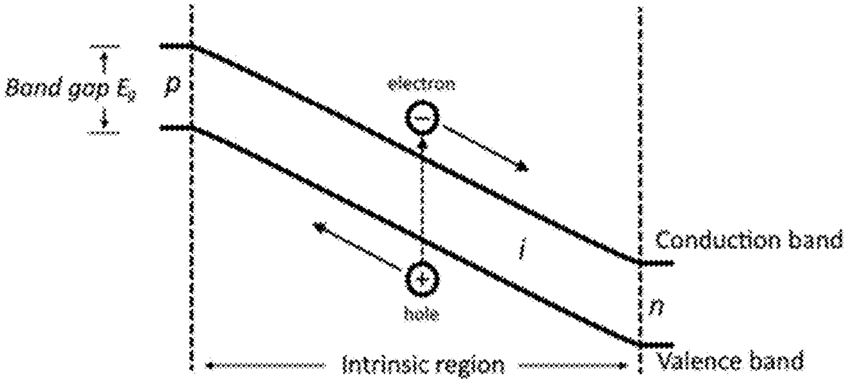
FIGURE 2

Fig. 3A
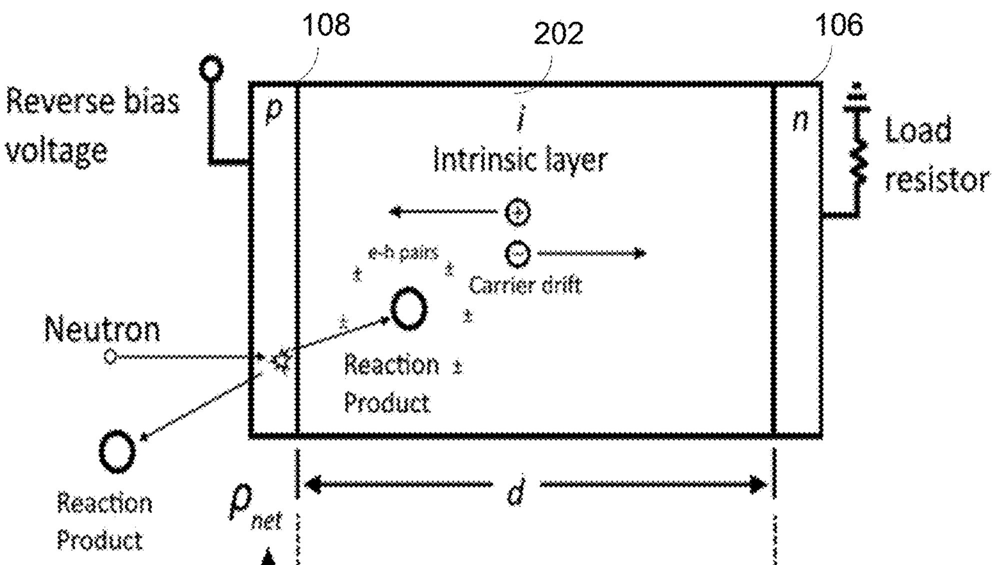
Fig. 3B
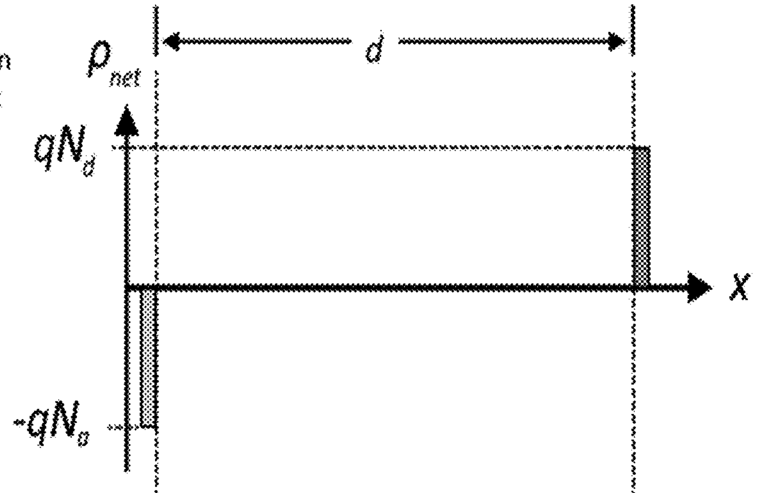
Fig. 3C
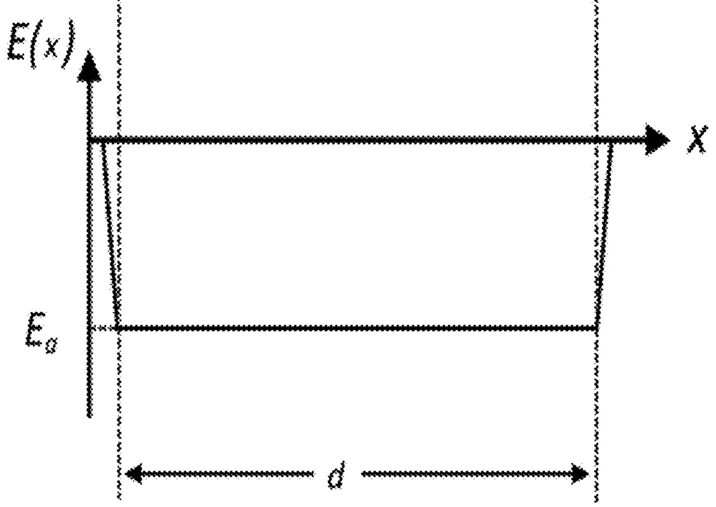
FIGURE 3

NEUTRON BEAM MONITORING SYSTEM

PRIORITY CLAIM

This application claims priority to U.S. Provisional Patent Application No. 63/541,233, titled Neutron Detection and Imaging filed Sep. 28, 2023, and further claims priority to U.S. Provisional Patent Application No. 63/541,235, titled Neutron Beam Monitoring System filed Sep. 28, 2023, both of which are herein incorporated by reference.

STATEMENT REGARDING FEDERALLY SPONSORED RESEARCH AND DEVELOPMENT

These inventions were made with United States government support under Contract No. DE-AC05-00OR22725 awarded by the United States Department of Energy. The United States government has certain rights in the inventions.

TECHNICAL FIELD

This disclosure relates to particle monitoring and specifically to systems that monitor neutrons beams.

RELATED ART

A neutron beam monitor measures characteristics of neutron beams. The neutrons may be generated from particle accelerators, nuclear reactors, and other sources. The neutron intensities from these sources often fluctuate because of the inconsistencies in nuclear chain reactions, changes in the nuclear reactor core's temperature, delivery system inconsistencies, and varying demand.

Due to this variability, some neutron flows can have relatively low flow rates, which makes it challenging to detect and measure neutron flows. Some neutron detectors have high efficiency absorption rates and/or scatter rates absorbing or scattering a significant portion of the neutron beam causing inaccurate detections and measurements. Some neutron monitoring systems drift over time causing inaccurate detections and measurements.

A neutron beam monitor measures characteristics of neutron beams, such as neutron flux. A neutron beam monitor may sample neutron beam conditions at a point along the neutron's flight path. If a different neutron detector is used to measure the neutron beam along that flight path, variations in the observed count rate may occur due to changes in the neutron beam. These changes differ from those caused by flight path conditions.

Neutrons may be generated from particle accelerators, nuclear reactors, and other sources. Output from particle accelerators may vary due to their complexity and challenges in maintaining consistent beam transport conditions. Neutron fluxes may also change in nuclear reactors due to fuel burnup and changes in its core temperature. Further, once generated, neutrons pass through moderators that are sensitive to temperature and other influences. Further, a neutron beam line may contain choppers, slits, and other components that may alter the transported neutron flux. All of these factors may influence the neutron flux present at the beam monitor.

Additional beam line components and sample characteristics may also alter the neutron flux delivered to a detector.

Neutron scattering from various sources may alter neutron flux at a detector and other factors may cause a detector to drift over time.

DESCRIPTION OF THE DRAWINGS

The components in the figures are not necessarily to scale, emphasis instead being placed upon illustrating the principles of the invention. Moreover, in the figures, like-referenced numerals designate corresponding parts throughout the different views.

FIG. 2 shows a P-type layer, an I-type layer, and an N-type layer in a band structure (P-I-N) with FIG. 2A showing a neutron striking a P-type semiconductor layer functioning as a low efficiency neutron reactive layer, FIG. 2B showing a neutron striking a physically separate neutron conversion layer, and FIG. 2C showing charge flow through the intrinsic region.

FIG. 3 shows a neutron converter on a P-I-N junction and its uniform built-in field, with FIG. 3*a* showing a P-I-N structure under a reverse bias; FIG. 3B showing a charge density profile showing abrupt junctions, and FIG. 3C showing an electric field profile within the junction.

DETAILED DESCRIPTION

Figure 1:
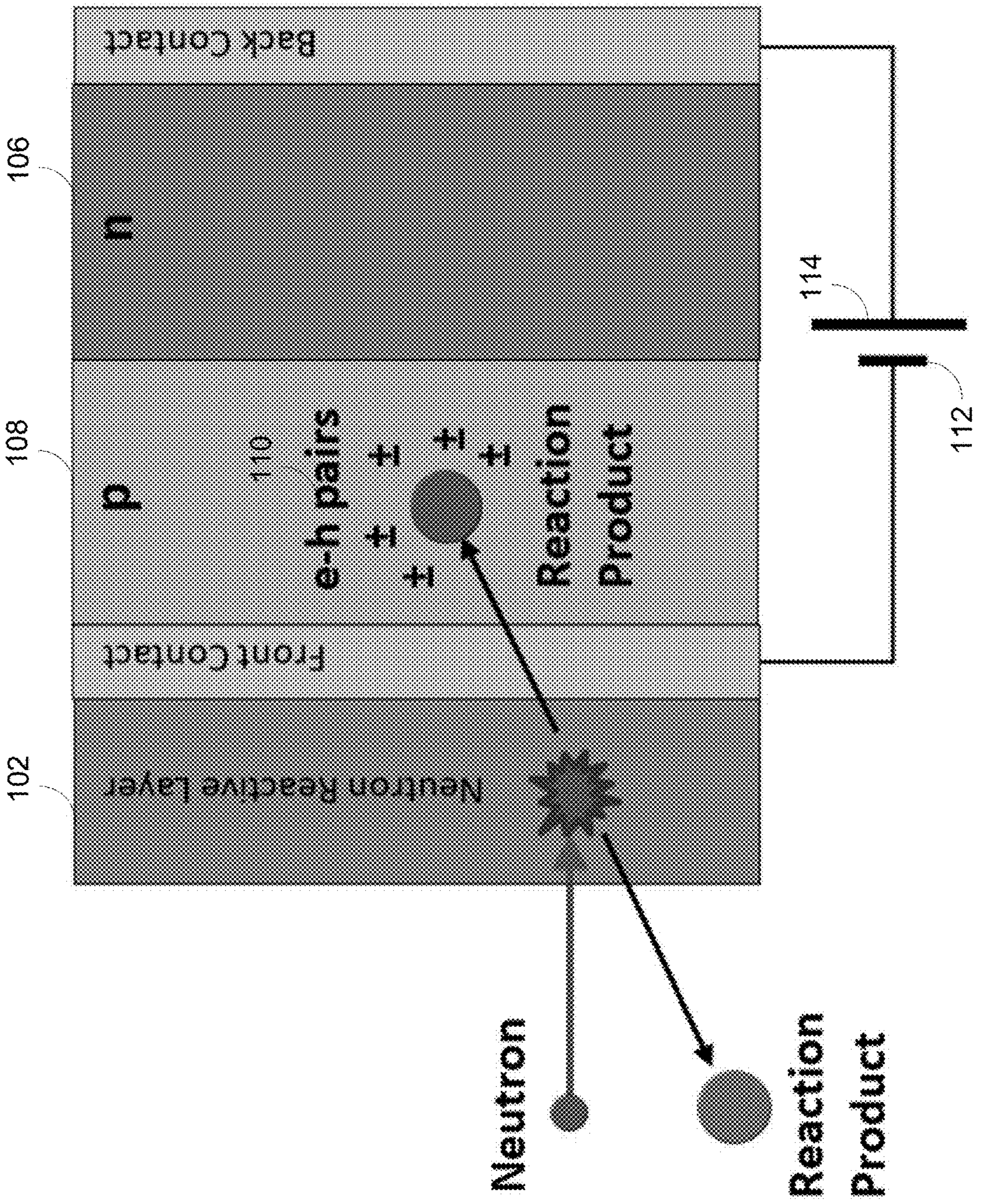
FIG. 1 is an exemplary neutron monitoring system.

A neutron monitoring system and method (referred to as a system or detector) provide precise and accurate neutron detections and measurements. Some systems detect and/or monitor beams of neutron particles in real time, including some which have fluxes exceeding one quadrillion neutrons per-second.

Some systems are semiconductor based and have junctions formed between regions of the same semiconductor material and some systems are semiconductor based and have different doping levels and junctions formed between different semiconductor materials. The different semiconductor materials have different crystal lattice structures and elemental compositions.

The junctions that comprise a metal in physical contact with and adjacent to a slightly doped semiconductor material may form a diode that has a faster forward time (it responds faster) and operates at a lower voltage than a doped silicon diode in other semi-conductor based systems. A thin neutron transparent or semi-transparent material forms an entrance window or part of an entrance window to the monitoring system that allows atomic particles (e.g., such as neutrons) to enter the system while blocking or attenuating (e.g., minimizing) other particles such as protons and electrons and/or electromagnetic radiation (e.g., gamma rays) from interacting with the detection media. A neutron reactive layer that comprises about a one micron of boron and/or lithium layer in some systems comprise an entrance window or part of an entrance window that interacts with the incident neutrons and serves as a neutron conversion layer or converter that transforms incident neutron strikes into detectable carrier/incident signals such communication signals that include electrical and/or optical signals. The carrier/incident signals carry information and/or data. The compactness and lightweight characteristics of some of the systems are part of small portable electronic devices such a pocket-size scanners while other systems are scaled to larger non-portable systems.

In alternate systems, neutron reactive layers comprising an extremely high carrier concentration silicon doped with elements from Group III (e.g., boron (B), aluminums (Al), Gallium (Ga)) such as a degenerated P+ crystalline silicon comprise a cathode element within a two parallel plate avalanche chamber that releases primary charged particles. The charged particles are converted into primary electrons within a gas element of the system and amplified by an internal gas multiplication effect for the registration of neutron incidents. The systems, like the semi-conductor based systems, track sub-nanosecond charge transit times.

The disclosed systems herein register signals through a preamplifier, a shaper, a discriminator, and a baseline restorer. The systems' precision and accuracy measure and analyze events to short time scales and short time periods. The systems may be used in neutron scattering facilities and in security applications, for example. Some are used for dose measurements during single low intensity events and some are used in higher subatomic transient events, continuous subatomic events, or semi-continuous subatomic events including nuclear events much like the semiconductor based systems.

The compact high rate neutron monitoring systems may count neutrons and determine their position along a single coordinate and/or double coordinate axis in batch processes and/or in real time processes. The low absorption efficiency (e.g., from about a tenth to one hundred millionth absorption rates and any discrete values or range therebetween) of the systems measure neutron flux, provide precise timing, and/or provide ultra-high definition position resolutions. The systems improve counting statistics at high neutron energy levels and facilitate moderator studies. Moderator studies analyze and examine one or more moderator variable during a relationship analysis between two or more variables including independent variables and/or dependent variables.

The systems include neutron transparent materials positioned along the neutron beam path. The neutron transparent materials are part of the neutron system's detector housing and are near the neutron detector's inner components. The systems include a low absorption efficiency neutron converter which acts as a source of charge carriers. The fast collection of these carriers, while operating in an unsaturated state, is tracked by the system's high rate counters and/or readout displays. The system's fast signal processing minimizes bottlenecks reducing the likelihood of coincident events that occur in high density flows. The system's readout displays render numeric and data driven information in a clear and an easily readable format.

An exemplary system that includes a neutron reactive layer potentially containing isotopes of boron, lithium, helium, etc. (such as $^{10}B$ or Boron-10, $^{6}Li$ or Lithium-6, $^{3}He$ or Helium-3, etc.) that comprise a neutron-to-charge particle converter (referred to as a converter, or a neutron-to-charge particle converter, for example) is expressed through the equations denoted as Equations 1.

$$^{10}B+n\rightarrow{}^{7}Li+{}^{4}He+2.3\text{ MeV}+0.48\text{ MeV}(\gamma)$$

$$^{3}He+n\rightarrow{}^{3}H+{}^{1}H+0.764\text{ MeV}$$

$$^{6}Li+n\rightarrow{}^{4}He+{}^{3}H+4.8\text{ MeV} \quad (1)$$

The systems detect thermal neutron events via nuclear reactions or recoil interactions, for example. The charged particles are detected through one or more systems that may comprise gas proportional counters with a parallel plate avalanche chamber and/or semiconductor-based radiation detectors and monitors.

The semiconductor-based systems include a neutron reactive layer such as Lithium-6 and/or Boron-10 ($^{6}Li$ and/or $^{10}B$), and/or boron-doped silicon, for example, that forms an entrance window or part of an entrance window of the system. The semiconductor-based systems effectively monitor low efficiency neutron beams. The semiconductor-based systems' efficiency is tailored by the material and thickness of a neutron reactive layer acting as a neutron-to-charge particle converter. The neutron-to-charge particle conversion transforms neutron radiation detections into more common detectable radiation types. A common feature of the reactions expressed in Equations 1 are that the by products are ejected in directly opposite directions, and generally create ionization tracks that extend several microns (solid) or millimeters (gas) from the neutron conversion's location. In lithium or boron based systems, for example, the combined range of an alpha and a triton is of the order of 100 μm (micrometers) and 3 μm, respectively.

In some systems, the neutron reactive layer functioning as the neutron-to-charge particle converter in the semiconductor-based system structure couples junctions formed by metal in physical contact with a semiconductor material, a junction formed by two semiconductor materials of the same material and charge type (both are n-type or p-type) but with different doping levels, and/or a junction formed by two semiconductor materials of different material types (one is n-type 106, and the other is p-type 108) as shown in FIG. 1 or different semiconductor materials altogether between two electrodes. When a neutron incident occurs in the neutron reactive layer 102 of FIG. 1, charge particles are generated in the neutron reactive layer 102 that are absorbed within the semiconductor materials, creating electron-hole (e-h) pairs 110. The electron-hole (e-h) pairs 110 drift toward a collecting electrode that facilitates the registering individual neutron incidents by rendering signals or pulses. In some systems, the drift rates reach sub-nanosecond charge transit time ranges, allowing the systems to measure and monitor high neutron-rate incidence.

Neutron registration and/or counting circuit(s) comprise a preamplifier that amplifies weak signal or pulses before the pre-amplified signals are further processed, a pulse shaper that modifies the shape and/or duration of the pre-amplified signals, and a single- or a dual-threshold discriminator that may execute a constant fraction discrimination on the pulse shaped signals to attenuate dependence of time measurements on amplitude of the signal. To correct direct current offset or baseline drift, a baseline restorer may further process the signals before they are further processed by a discriminator that distinguishes neutron-induced events from other noise and/or other radiation events. Discriminated pulses can be recorded by several techniques, which may occur in parallel. One option is an asynchronous counter, such as an up counter. Another options is a device that associates a time stamp with each neutron induced event.

A time stamp comprises an absolute time measurement when an event occurs in some systems. In other systems, it comprises an elapsed time after some event of interest to that measurement. Some events are added to a list of some or all other events associated with the measurement; in some applications, the measurements are associated with a graphical representation like a histogram, for example.

The circuits are compact and light weight making them adaptable to portable devices and scalable to larger and/or more complex fixed location or non-mobile instrumentations and operate without being driven into saturation up to a maximum required flux density of about $10^{15}$. Some or all of the neutron registration and/or counting circuit(s) are compatible with and interface with all of the monitoring systems disclosed herein in alternate systems. Operating in an unsaturated state or non-saturated state refers to a monitoring system's circuit or operating condition that is operating at or below its maximum capability or within its specified range for normal operation for a given condition.

A neutron conversion into an incident signal occurs through a conversion, a transport, and an extraction. A neutron incident with the neutron reactive layer 102 generates a negatively charged electron in a conduction band and a positively charged hole in a valence band. The electrons and holes move in response to applied electric fields with the electrons moving toward the cathode 114 and holes moving in the opposite direction toward the anode 112, generating a net charge flow. In some systems, internal amplification by avalanche properties occurs when the charge carriers (electrons and holes) collide with other items creating additional electron-hole pairs that may result in an exponential multiplication of the charge carriers. Extraction of the generated carriers results in current pulses that represent the neutron events.

In some semiconductor-based systems, a neutron reactive thin film 102 of approximately a sub micro meter (μm) couples semiconductor rectifying junctions to convert a neutron incidence into charged particles that can be detected. The one or more junctions may comprise a type of metal-semiconductor junction in which a metal physically contacts a semiconductor material like a Schottky barrier, P-N junction(s) (P-type and N-type junction), P-I-N junction(s) (P-type, I-type, and N-type), avalanche junction(s), or heterojunction(s) that generate charge carriers in a depletion region. The junctions comprise the rectifying junctions of the semiconductor-based monitoring systems.

FIG. 2 shows a P-type semiconductor layer 108, an I-type semiconductor layer 202, and a N-type semiconductor layer 106 in a detector band structure. FIG. 2A shows a neutron striking a P-type semiconductor layer 108 acting as neutron reactive layer 102. FIG. 2B shows a neutron striking a physically separate neutron conversion layer functioning as a neutron reactive layer 102 coupling the P-type semiconductor layer 108. When a neutron strikes the P-type layer, the neutron may undergo elastic scattering, inelastic scattering, and neutron capture resulting in different formations. In some instances, the neutron is captured in the P-type semiconductor layer 108 that it strikes first resulting in the release of energy and other particles resulting in a neutron-to-charge particle conversion. When a neutron strikes the neutron reactive layer 102 first, the neutron incidence may result in the emission of charged particles that carry energy and produce an ionization within that conversion layer. Upon neutron capture in the reactive layer 102 at the semiconductor device's entrance window, the charged particle energies ranging from about 0.8 kilo-electron volts (keV) to 4.8 mega-electron volts (MeV) are generated in a neutron reactive layer 102 of few micrometers in width comprising a boron layer to a reactive layer of about 130 micrometers (μm) in width comprising a lithium layer. The charge created by these energies ionize and excite the atoms through the respective charge paths until it is exhausted. In these nuclear reactions, the resulting products are ejected in opposite directions and generally produce ionization tracks that extend several micrometers into the semiconductor-based system. In some applications, the charge flow in the opposite direction within the intrinsic layer 202 may be lost, thus reducing the neutron detection's intensity or signal amplitude. FIG. 2C shows the charge flow in the intrinsic layer region 202 relative to a band gap between the P-type layer 108 and the N-type 106 layer.

FIG. 3 shows the ionized impurity concentration profiles at the electrodes and the electric field profile across an intrinsic layer positioned between P-type 108 and N-type 106 layers. FIG. 3A shows a P-I-N structure under a reverse bias. FIG. 3B shows the charge density profile indicating the abrupt junctions. FIG. 3C shows the electric profile of the junction that ensured fast transit times. A neutron reactive layer 102 (not shown) overlying the P-I-N structure interacts with the neutrons in a way that may change the neutrons behavior and convert them to detectable particles or signals.

In FIG. 3, the P-layer 108 is doped with boron, a trivalent impurity. In some systems, the boron-doped layer comprises a degenerate a degenerated P+ crystalline silicon, with all of the energy levels in the valence band occupied by electrons up to the Fermi level. In FIG. 3, the P-layer 108 can serve as a low-efficiency neutron-to-charge particle conversion layer. The I-layer 202 is intrinsic (e.g., undoped) with a width that may be configured to match the charge particle range created upon a neutron capture. In a reverse bias mode, this intrinsic layer 202 is fully depleted and free of any mobile charge carriers. The exemplary N-layer 106 is doped with phosphorous, a pentavalent impurity, with a high concentration to form an resistive contact.

In the silicon-based system use case, a neutron is absorbed in a thin neutron reactive layer 102 of a silicon-based system entrance window. The incidence generates charged particle energies (E), ranging from about 0.8 keV to 4.8 MeV, and releases primary electrons whose number, N, is expressed in Equation 2.

$$N = \frac{E}{\varepsilon} = \frac{4{,}800{,}000}{3.6} = 1{,}333{,}000 \tag{2}$$

ε comprises the mean energy to create an e-h pair in silicon, which is about 3.6 eV.

The 1,330,000 holes and electrons (about $2.12\times10^{-13}$ Coulombs) are generated per neutron incident making the neutron incidence detectable without further amplification. Internal amplification through the semiconductor's avalanche property may amplify charged particles with lower energy levels.

In an exemplary use case, neutron reactive layers 102 were overlaid on a metal-semiconductor junction (e.g., a Schottky junction), a P-type semiconductor and a N-type semiconductor boundary and a diode structure where an intrinsic semiconductor region is sandwiched between P-type 108 and N-type 106 regions, respectively. Using an epitaxy process, a silicon carbide layer was grown on or overlaid upon a substrate. A neutron reactive layer 102 was deposited on the epitaxial silicon carbide (SiC) layer to form charged particle absorption layer. The epitaxial silicon carbide (SiC) was radiation hardened and chemically inert generating wide bandgap (e.g., 2.2 eV to 3.27 eV at 300K) resulting in low leakage currents in low-noise conditions, operational in high-temperature conditions, having a high thermal conductivity that enhances heat dissipation, having a high electric breakdown field, and a high electron saturation drift velocity. The silicon carbide (SiC) semiconductor radiation absorption layers are well-suited for beam monitoring and dosimetry where other systems do not perform well because of their susceptibility to radiation exposure (e.g., radiation does above 20 MGy) and poor humidity resistance.

Exemplary epitaxial silicon carbide (SiC) Schottky diodes having thick epitaxial layers (about L=20 μm) provided detections with a high level of temporal precision, were highly sensitive to charged particle and were effective in low noise conditions. Because of the high saturated drift velocity (e.g., $V_d$=2 $10^7$ cm/s) in an exemplary application, the electron transit time ($t_t$) for the epitaxial silicon carbide (SiC) Schottky diodes provided a short transit time as expressed in Equation 3.

$$t_t = \frac{L}{V_d} = 10^{-10} \text{ seconds} \tag{3}$$

The sub-nanosecond electron transit times ($t_t$) in this exemplary use case provided counting rates exceeding one-hundred million counts per second. To optimize charge collection efficiency, the full depletion layer or depletion width is selected to match the projected range of charge particles, ensuring an effective charge collection.

Figure 4:
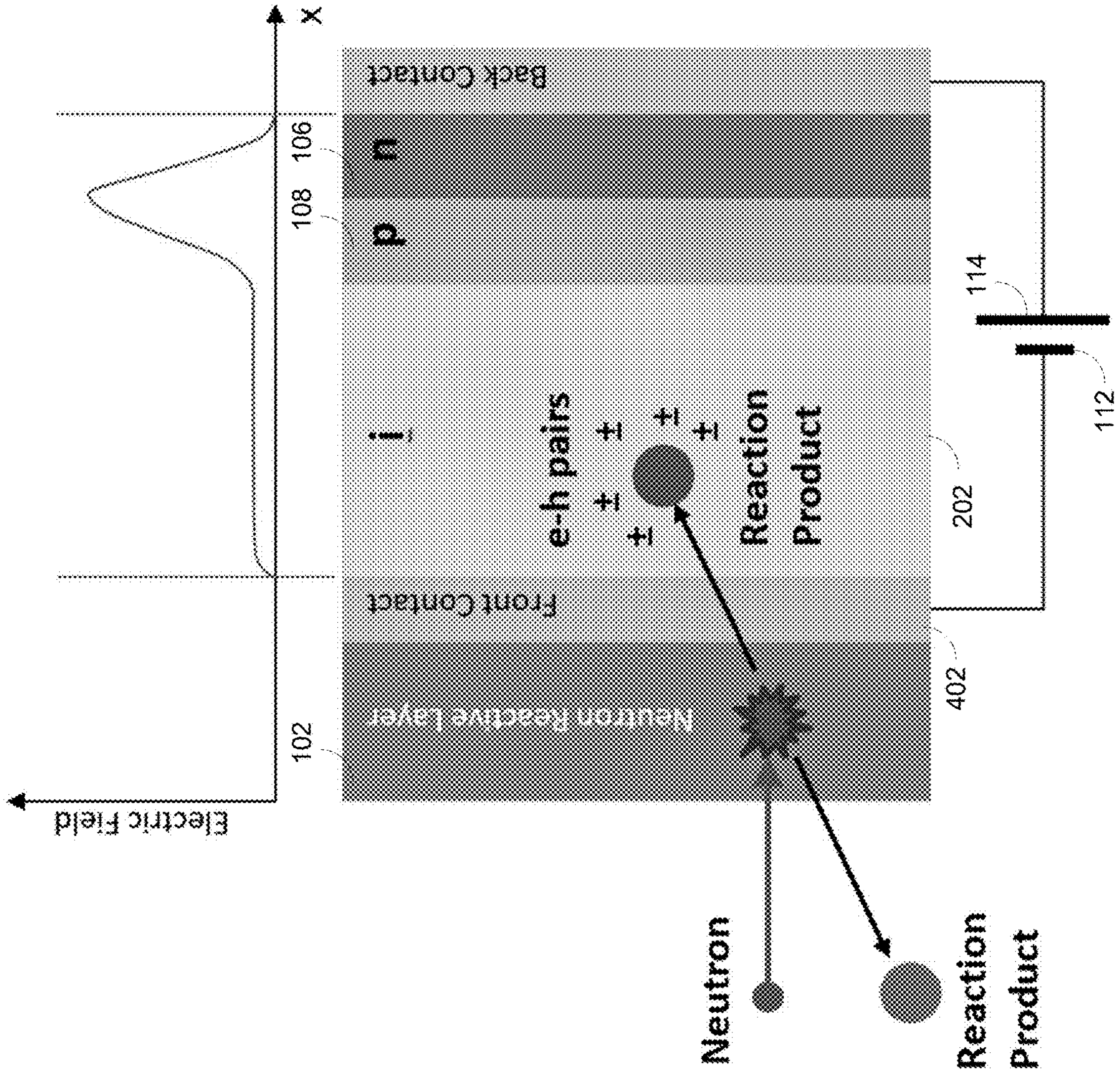
FIG. 4 is a schematic of a neutron reactive layer coupled to a reach-through avalanche diode type.

A reach-through avalanche type photodiode shown in FIG. 4 has an entrance window comprising a heavily doped P+ layer that functions as a reactive neutron layer 102 where neutron captures occur. The system conducts neutron beam measurements with low efficiencies without detector saturations making the system suitable for use with spallation neutron sources and high intensity radiation beams. When used with semiconductor strip detectors or display systems using delay lines, the systems display neutron intensity patterns, neutron beam localizations, and/or neutron beam profiles.

In an exemplary use case of FIG. 4, charged particles are absorbed in the conversion region 108 where electron-hole pairs are produced, and an internal gain occurs by the multiplication of electrons and holes in the region under high intensity electric fields. Low neutron absorption efficiencies of about one millionth to one-hundred million (e.g., $10^{-6}$ to $10^{-8}$) or discrete values or ranges in between are obtained from a boron-doped entrance layer. A deposition of thin monolayers of boron-10 ($^{10}$B) on the avalanche photodiode type entrance window 402 result in about a 0.1 to 0.01% efficiency. Individual neutron captures render fast signal tracking (e.g., less than one nanosecond) resulting in one hundred million ($10^8$) counts per second tracking capabilities. With a one-hundred millionth (1/100,000,000) absorption neutron efficiency, this exemplary system measures over ten quadrillion neutrons per second. In the exemplary reach-through avalanche photodiode system, the internal gain is adjustable to compensate for temporal and physical properties of the semiconductor materials over time (e.g., compensate for the ageing effect). A monolayer refers to single layer of molecules or atoms that are arranged in a closely packed two dimensional structure.

In an exemplary beam monitoring operation, signal registration is executed by a preamplifier, a baseline restorer, a shaper, a single or dual threshold constant fraction discriminator, and an optional counter and a time stamper. In a beam monitoring mode, current pulses representing neutron detections received by the system shown as a beam monitor 502 are amplified to a predetermined level by a preamplifier 504 in FIG. 5. A pulse shaper 508 modifies the shape and/or duration of the pre-amplified signals, transforming them to a detectable format and improving their signal-to-noise ratio. An optional baseline restoration circuit (not shown) compensates for signal offset and baseline drift. An exemplary discriminator 508 distinguishes neutron-induced events from noise and other types of radiation. In some systems, discrimination is based on pulse-shapes, energy levels, and/or timing information. Some discriminators 508 apply a constant fraction discrimination to provide a required time resolution with signals of broad amplitude distributions. Some other discriminators 508 apply a threshold discrimination that provides a selection of a narrow energy range for registration that rejects background noise and other types of radiation from neutron and neutron induced events.

Figure 5:
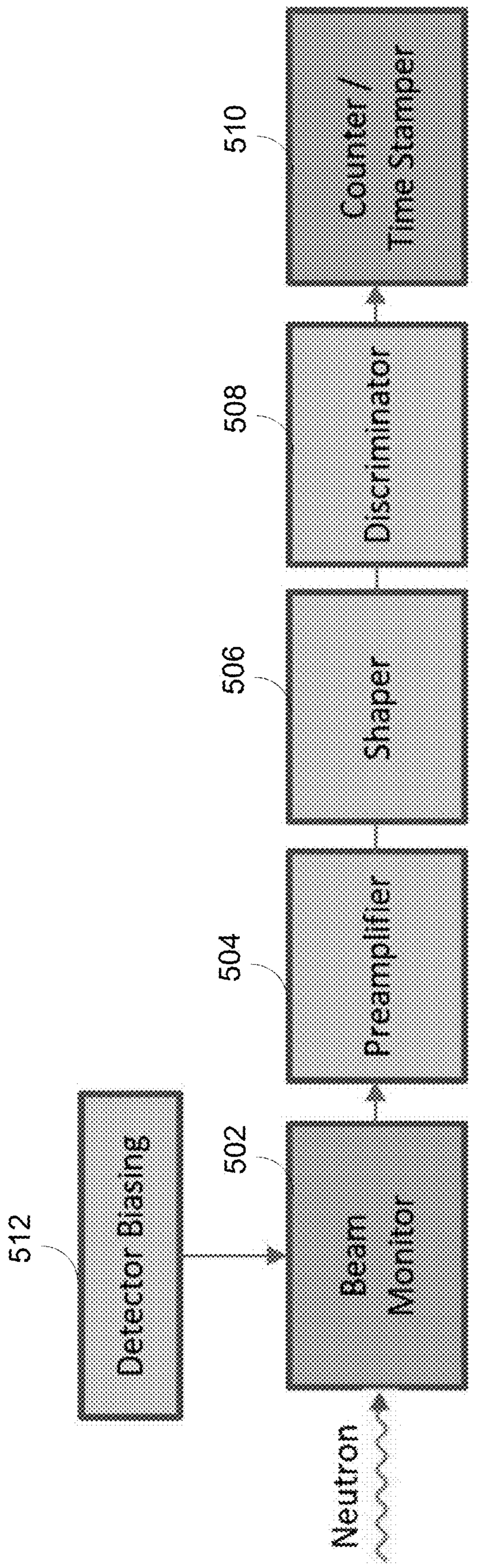
FIG. 5 is electronic circuitry that generates spectral information from a neutron beam monitor.
Figure 7:
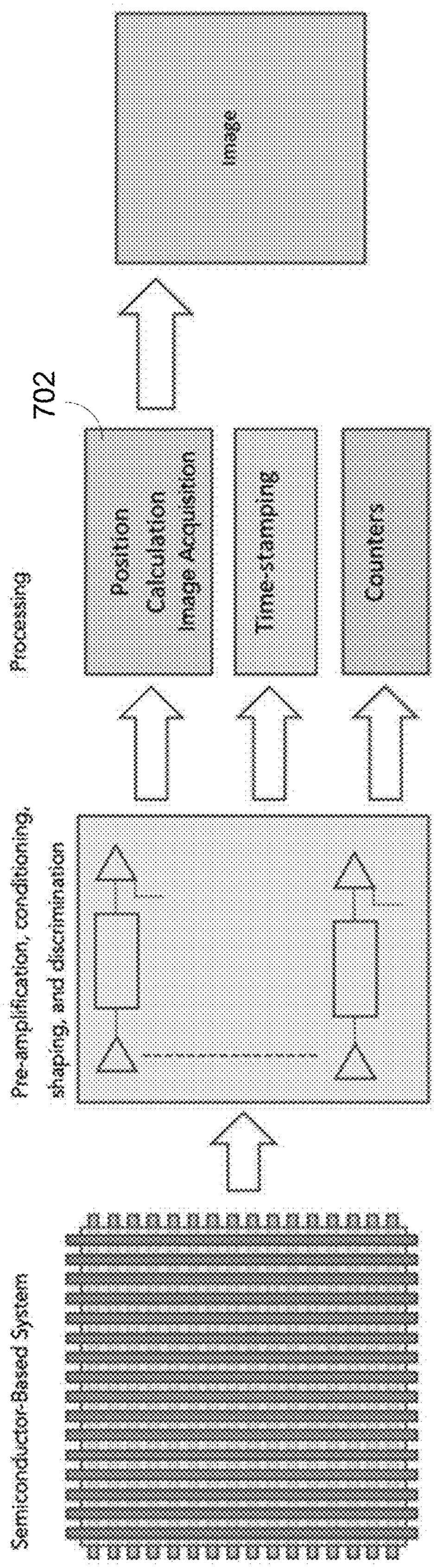
FIG. 7 is a beam monitoring and imaging readout circuit for a monitoring system.

The digitized pulses produced by the discriminator 508 are analyzed by a counter/time stamper 510 that may comprise the discrete circuits shown in FIG. 7 or a processor that generates spectral information. The spectral information may include temporal information (e.g., a timestamp of the event, time-of-flight of the particle, and/or etc.), pulse parameters, and/or information/data that identifies specific radioactive materials or identifies the presence of radiological materials or materials related to them in a sample and/or an environment. The temporal information may also include a specific time value indicating when the data was generated and/or when it was recorded in a memory. In FIG. 5, detector biasing 512 refers to applying a specific voltage and/or current to the electronic circuitry to optimize performance or functionality.

Figure 6:
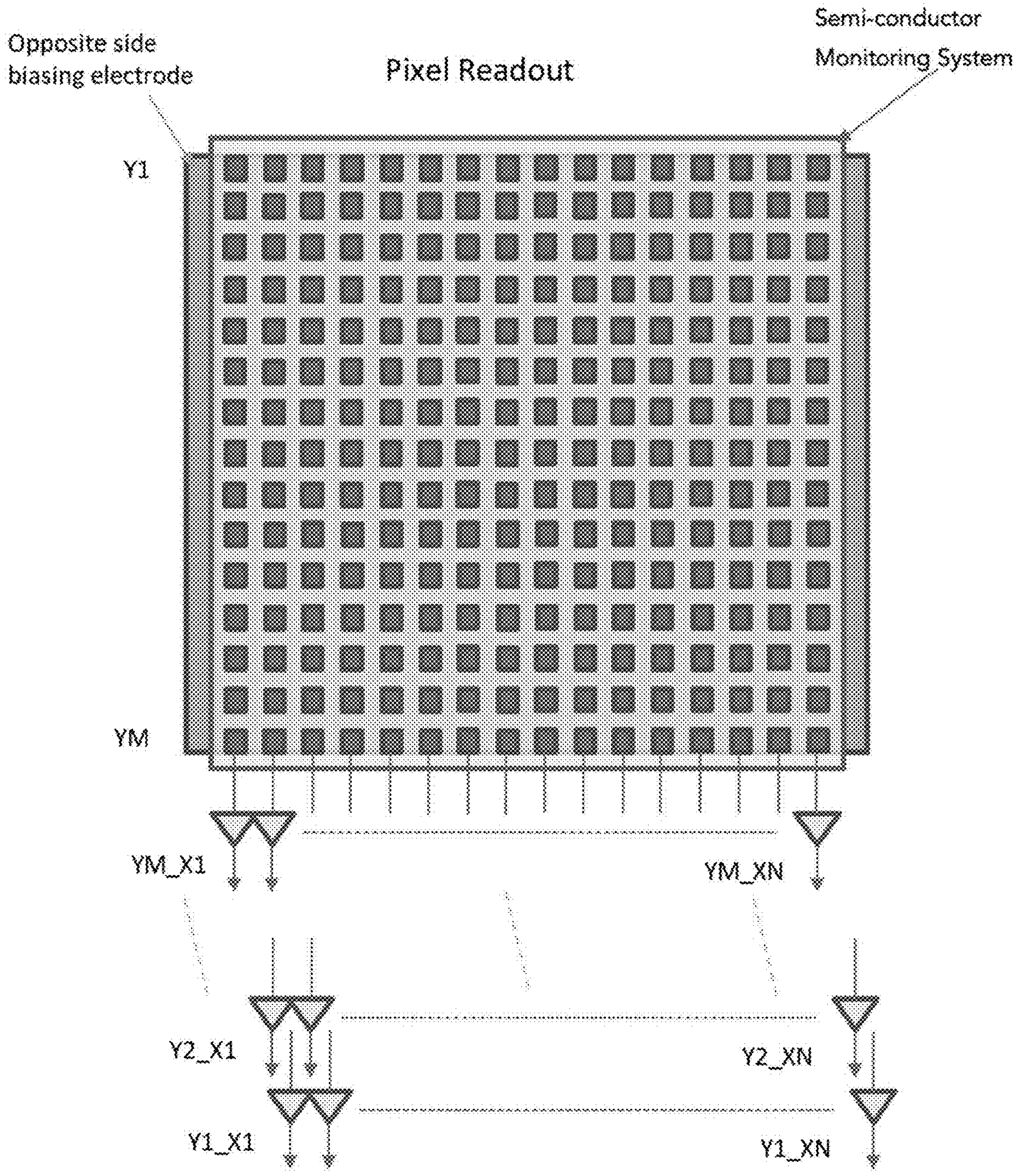
FIG. 6 is a pixel readout structure disposed behind a neutron reactive layer of a semiconductor system.

Adding position measurements with readout electrode structures transform some exemplary beam monitors into a beam imager that enables the monitoring system to not only measure high count rates, but also measure and display the shapes and profiles of radiation sources in real time. In the exemplary beam imager shown in FIG. 6, a pixel readout is generated through a two coordinate image where each pixel is in communication with a dedicated signal processing channel that corresponds to a coordinate position on a neutron reactive layer 102. All pixel channels are linked to a position measurement and image acquisition module 702 shown in FIG. 7. The pixel readout renders a high rate counting capacity based on dedicated data acquisition channels assigned to each position coordinate of the pixel read out that overlies, is associated with, or comprises the neutron reactive layer 102.

Figure 8:
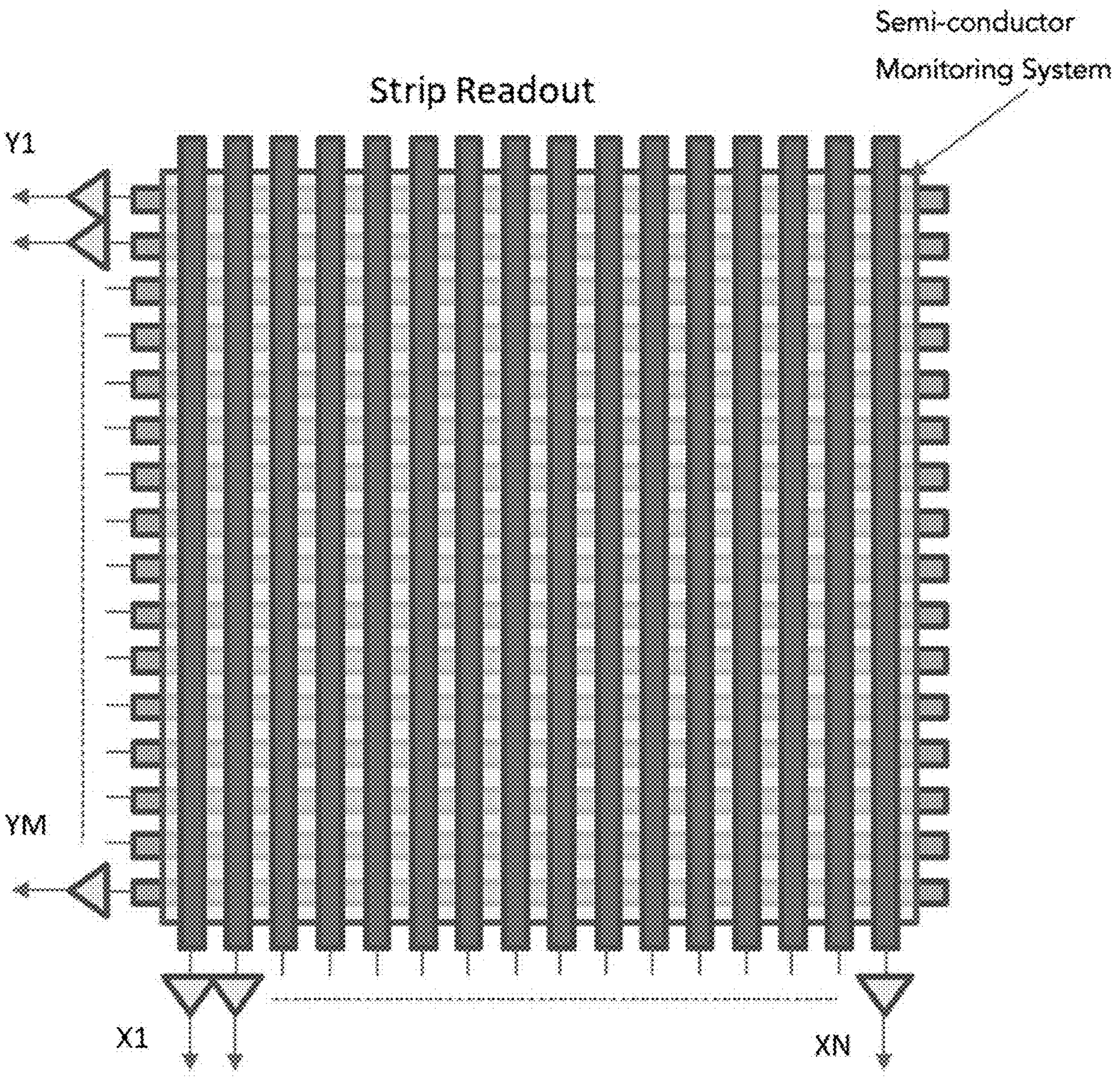
FIG. 8 is a strip readout structure disposed behind a reactive media of a monitoring system.

The strip readout structure of FIG. 8 comprises a thin layer of radiation sensitive strip material that detects and ionizes charged particles as they traverse it. In FIG. 8, each strip is linked to a dedicated signal processing channel. The strips interface a position and/or energy measuring image acquisition circuit. Although the strip readout of FIG. 8, has a lower counting capacity than the pixel readout of FIG. 6, it utilizes fewer data acquisition channels.

Figure 9:
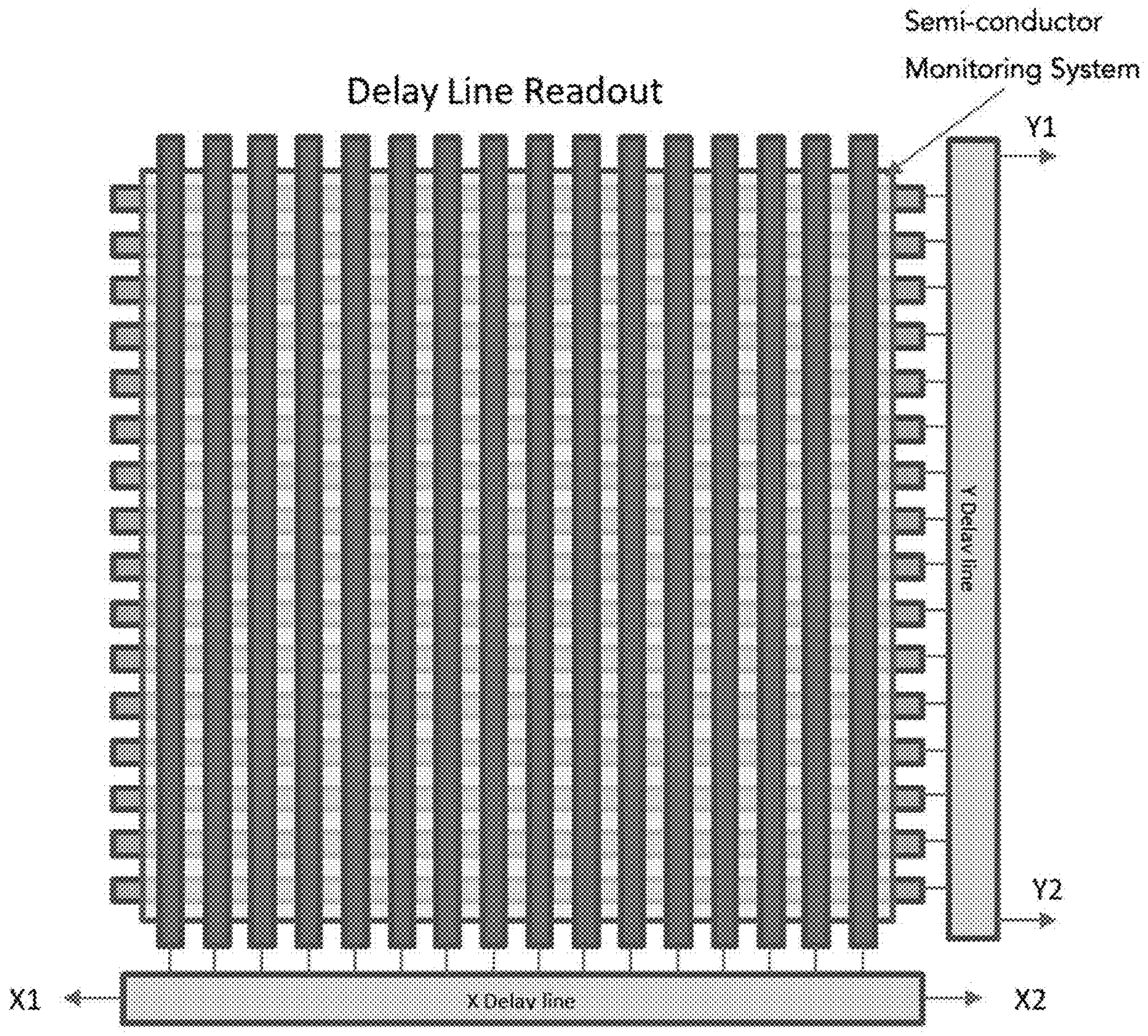
FIG. 9 is delay line readout structure disposed behind a reactive layer of a monitoring system.
Figure 10:
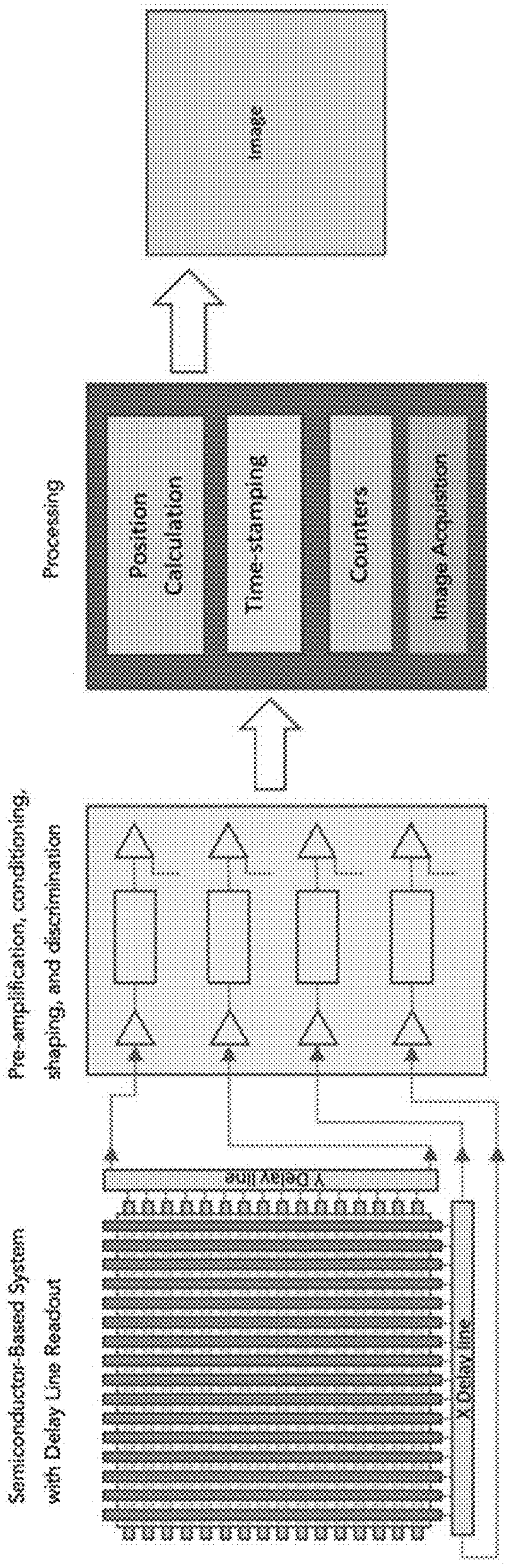
FIG. 10 is a beam monitoring and imaging readout circuit chain for a beam monitoring system that uses delay lines.

In a delay line readout structure of FIG. 9, neutron reactive strips associated with each coordinate, both in the X and Y dimensions, are electrically connected to taps of their respective delay lines. Each delay line has two outputs, which are linked to a measuring position circuit and an image acquiring circuit. The delay line readout of FIG. 9 has a lower counting capability compared to strip and pixel readouts as it requires fewer data acquisition channels, such as the four used in an exemplary use case. A processor or discrete logic match pulses from the exemplary channels and creates an event pattern that minimizes the dead time associated with the delay line. Specifically, an event processing is used that executes a cross-comparison between delay line pulses in the X coordinate and the Y coordinate directions via the processing of FIG. 10. Each of the monitoring systems described in this disclosure may provide four different readouts (e.g., a pixel read out, a strip read out, a delay line read out, and/or discrete value readouts that may include count rates, trajectory measurements, etc.) in real time, through real time operations, and/or through batch processing.

Figure 11:
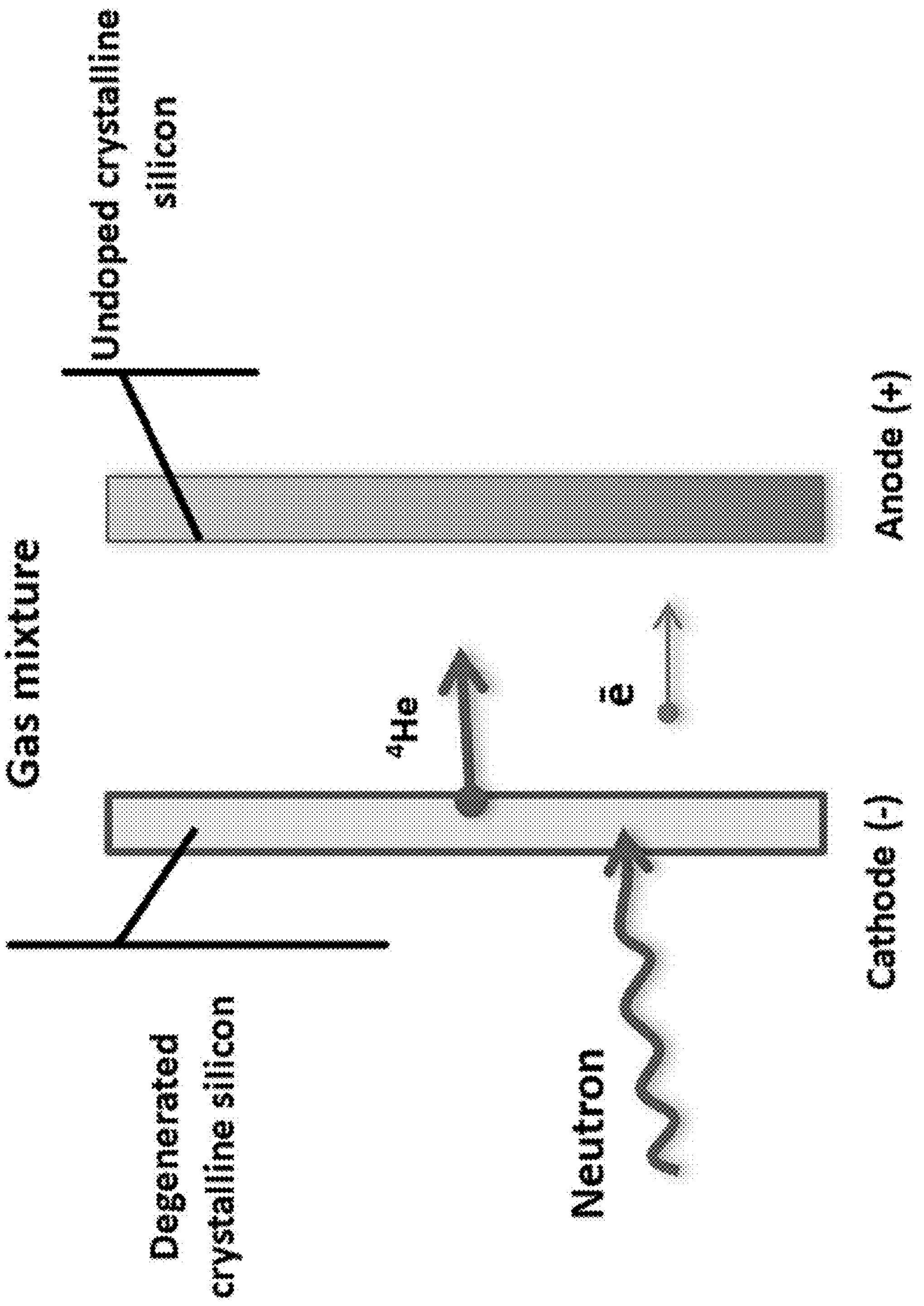
FIG. 11 is an exemplary gaseous detection device comprising a degenerated silicon.
Figure 12:
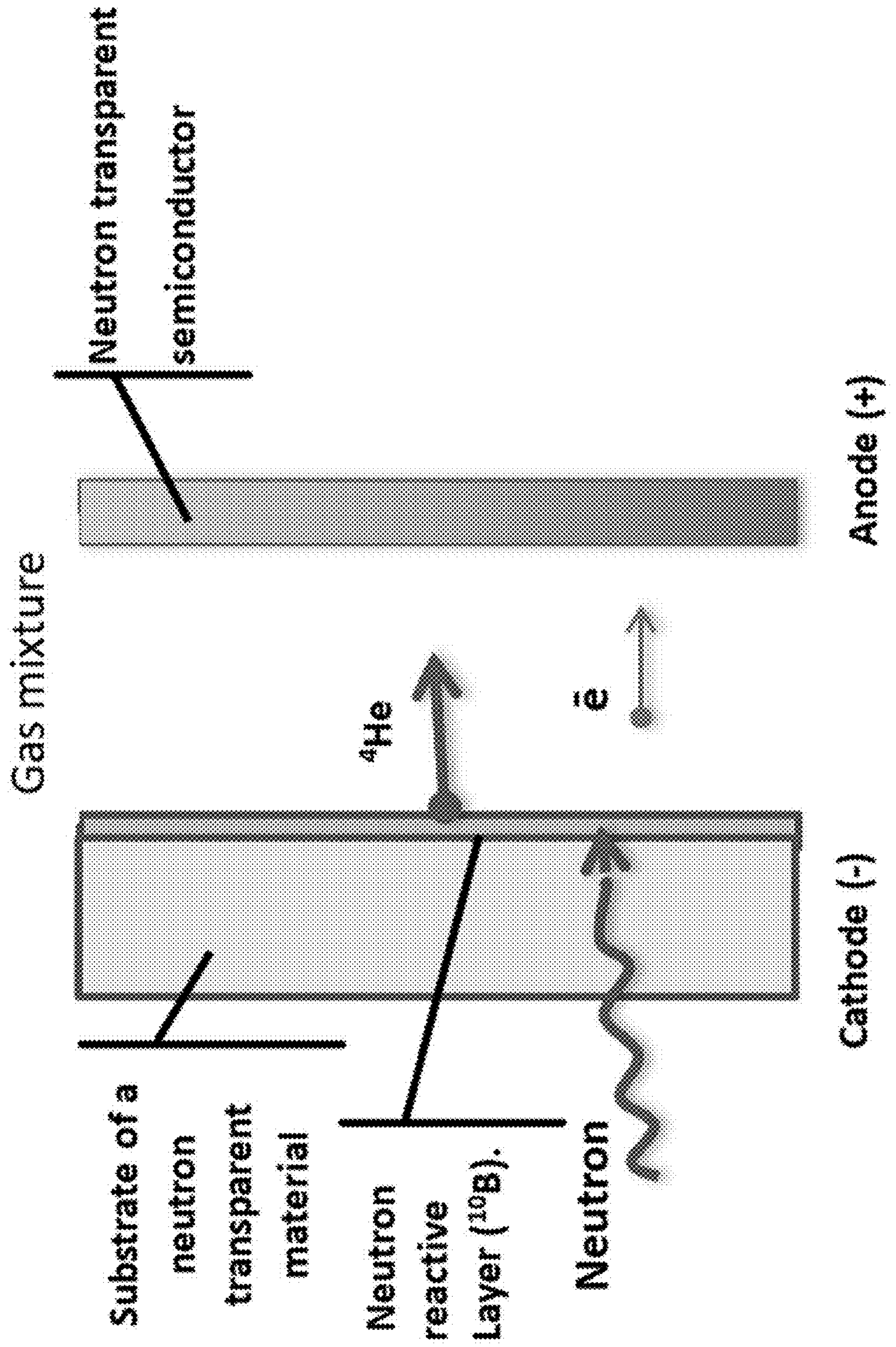
FIG. 12 is an exemplary gaseous detection device comprising a reactive layer.

A gaseous-detection based monitoring system also detects ionizing radiation events including neutron events. The gaseous-detection systems provide measurable responses in response to detections. The gaseous-detection based system includes a detector layer comprising two or more conducting or semi conducting plates. Some plates incorporate a radiation sensitive material such as lithium, boron, or gadolinium as constituents that cause the neutron to energetic charged particles conversion. Alternatively, the neutron conversion is due to a neutron sensitive material such as $^{3}$He included in the fill gas in another system. The two plates (such as quartz, crystalline silicon, aluminum, etc., for example) are maintained in a parallel spaced apart structure by a gaseous media or medium with the plates transparent to neutron flows. In a transmission mode, the neutron particles cross the entire detector with little absorption occurring through an entrance window before reaching the readout electrode within the housing. The gas in the spacing between the conductive plates serve as an avalanche multiplication layer, and in some cases a neutron conversion layer. Exemplary neutron-to-charge particle converters comprise a degenerated silicon (P+) substrate shown in FIG. 11 and a reactive neutron layer shown in FIG. 12.

The gaseous-detection based monitoring system's operation occurs with an interaction with a radioactive particle such as neutron expressed in Equation 1. In operation, some or all the neutrons' energy are transferred to charged particles. The charged particles then ionize and excite the atoms along its path until its energy is exhausted. In a gas-filled detection, approximately 25 eV is required to create an electron-ion pair. The maximum number of primary electrons, $\eta$, is expressed as in Equation 4.

$$\eta = E/25 \quad (4)$$

where E comprises the kinetic energy of the charged particle (s) in eV. In this exemplary use case, helium-3 (3He) with an energy transfer of 765 keV ($\eta$=764 000/25=30 560 electrons), will release a total ions and electron per neutron corresponding to a charge of about $5\times10^{-15}$ coulombs (5 femtocoulombs).

When a positive voltage is applied to the gaseous-detection based monitoring system's anode, the electrons move toward it and the positively charged ions move toward the conductive cathode at the entrance window of the system. In its proportional operating mode, an electrical output signal is generated with a magnitude that depends on the applied voltage, the geometry of the counter, and the gas mixture.

Figure 13:
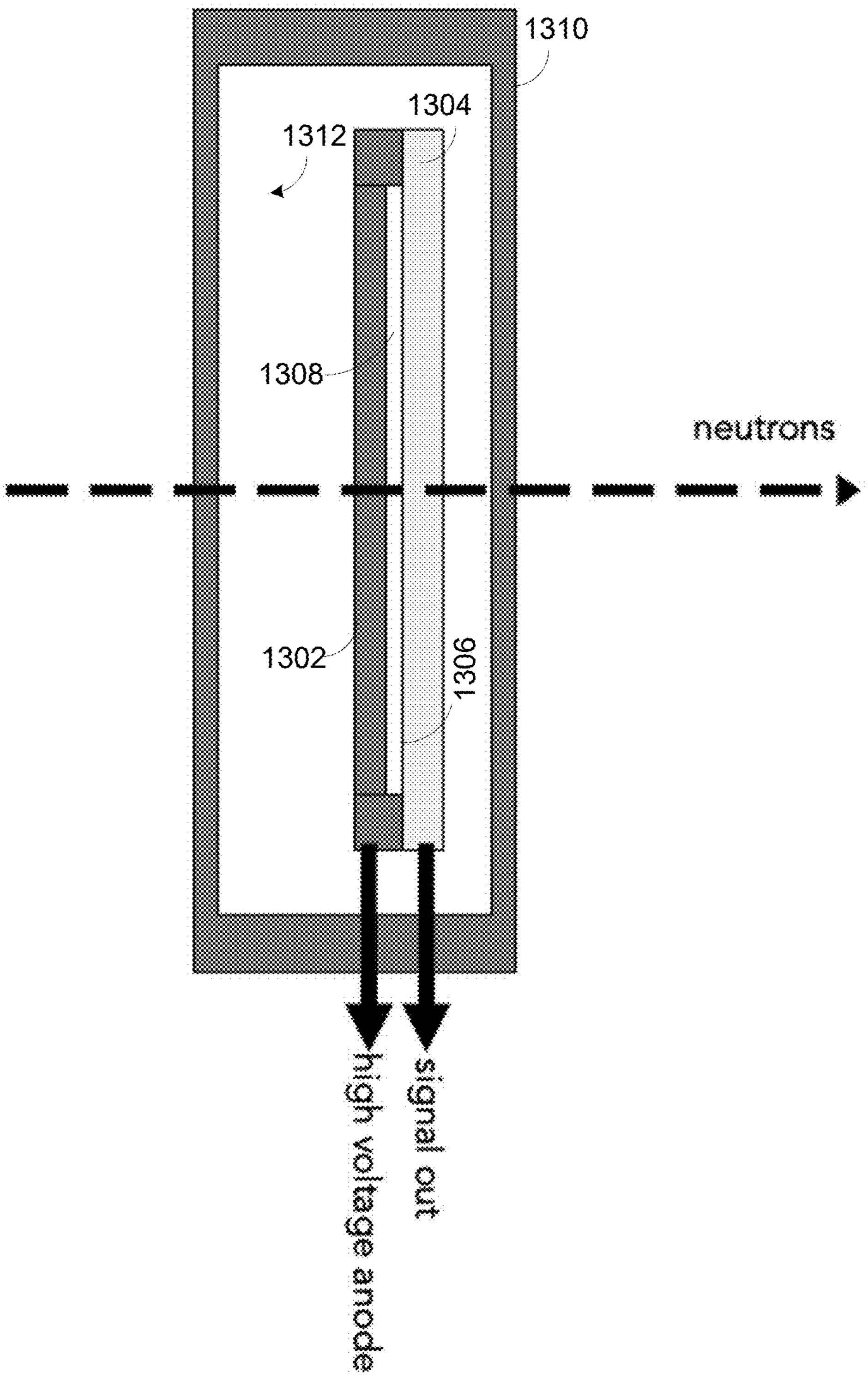
FIG. 13 is a housing enclosing parallel plates and gas mixtures that comprise a radiation detection-to-charge particle conversion media.

In FIG. 13, a housing 1310 encloses the substantially parallel plates 1302 and 1304, which act as the anode and cathode of a monitor. This housing contains a fill gas 1312. To minimize the loss of neutrons that pass through the housing 1310, the housing 1310 comprises a neutron transparent material with regions through which neutrons pass made at a minimal thickness that contains the gas. While housing materials will vary with the gaseous-detection based monitoring system's performance requirement and surrounding environment, aluminum is used in some applications. Secondary benefits of the housing 1310 include electrostatic isolation of the plates 1302 and 1304 from external noise sources and isolation of the plates 1302 and 1304 from sources of contamination and corrosion. Several fill gas compositions may be used, including an argon and carbon dioxide combination, a nitrogen and carbon dioxide combination, etc.

In a use case, the electrode 1302 comprises a neutron sensitive material such as boron near its surface or comprises a material coating such as boron carbide, for example. A neutron to charged particle conversion near the surface causes an energetic charged particle to extend into the gas 1312, where it generates ions and free electrons. The high voltage bias applied to the anode 1302 causes these ions and electrons to be collected by the plates, creating a current that serves as the output signal. For a sufficiently high bias, avalanche charge multiplication occurs in the gas within the gap between the plates, increasing the amount of charge collected. The electrode 1304 is constructed with a substrate of material such as quartz, crystalline silicon, etc., upon which a resistive layer 1306 outlines or is deposited. This layer reduces the electric field between the plates in regions where a high current is present, which tends to suppress sparking between the plates. The resistive layer 1306 allows the use of a higher bias voltage than would otherwise be possible, increasing the amount of avalanche charge multiplication that can be achieved. All of the gaseous-detection based monitoring systems may interface and are compatible with the monitoring systems disclosed and generally operates as disclosed herein.

Figure 14:
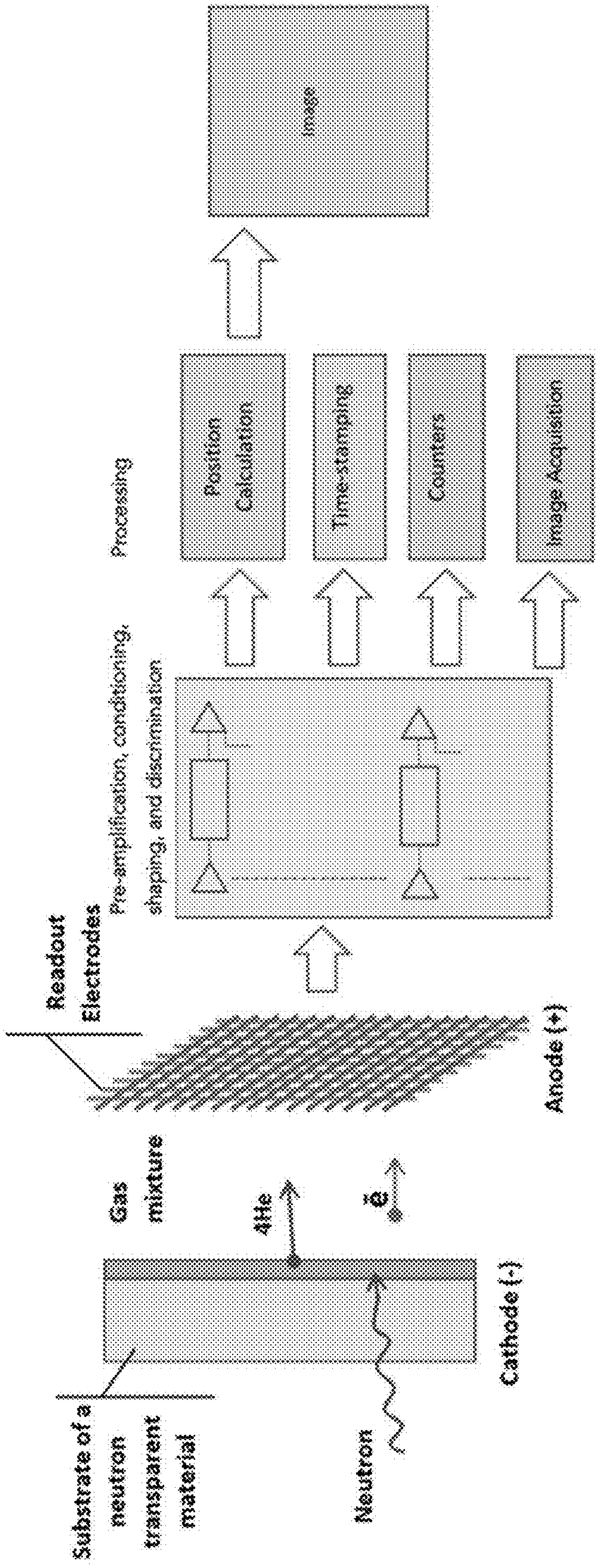
FIG. 14 is a beam monitoring and imaging readout circuit for a gas-based monitoring system.

Some gaseous-detection based monitoring systems use a strip readout that comprises a first set of substantially parallel neutron transparent metal strips supported by a first thin neutron transparent insulator ridge, and a second set of substantially parallel neutron transparent metal strips perpendicular to the first set of parallel neutron transparent metal strips supported by a second thin neutron transparent insulator ridge represented in FIG. 14. The collected charge is shared between strips in the two layers and a center-of-gravity calculation by the processing provides the central avalanche coordinate in two projections.

Figure 15:
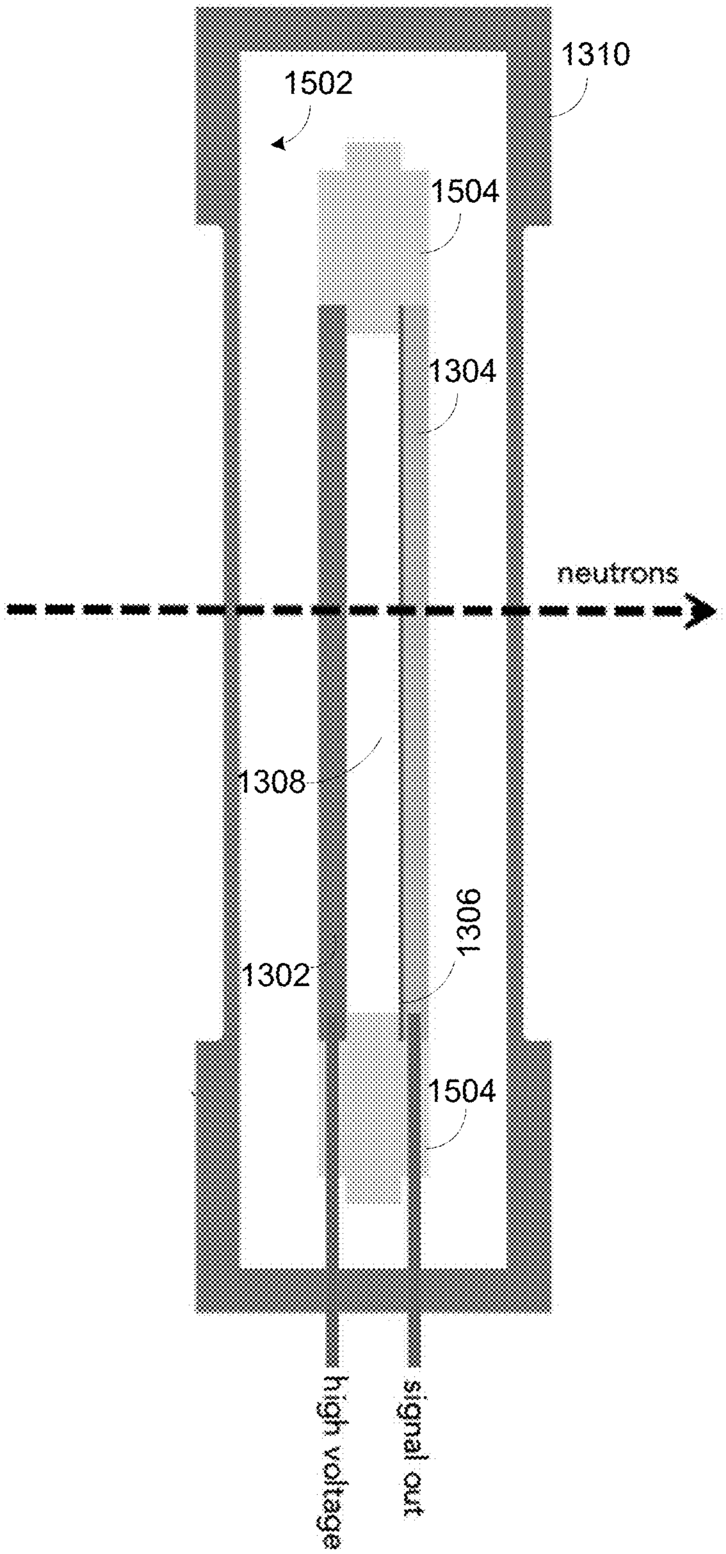
FIG. 15 is a housing enclosing parallel plates and a gas at low pressure that comprises a radiation detection-to-charge particle conversion media.

A variation of the design illustrated in FIG. 13 is shown in FIG. 15. The primary difference is that the neutron to charged particle conversion takes place within the fill gas 1502 instead of at the electrode 1302. This enables the selection of construction materials for the electrode to be based on neutron transparency and electrical properties, eliminating the need for neutron-sensitive materials. In this use case, the fill gas includes a neutron sensitive material. $^{3}He$ is used in higher efficiency monitors. For low efficiency monitors, $^{14}N$ is an option. $^{14}N$ has a neutron capture cross section of 1.8 barns. It generates charged particles as expressed in Equation 5.

$$^{14}N+n={}^{14}C+p+627\text{ keV} \tag{5}$$

585 keV of the energy goes to the proton, while 42 keV goes to the $^{14}C$. The plates are mounted on spacers 1504 that maintain a substantially uniform separation between the electrodes and enhances the mechanical stability and integrity of the plates. This maintains a substantially uniform amplification gap 1308.

An electric current is induced by the charge moving in the vicinity of the anode 1302 as determined by the Shockley-Ramo theorem. It is based on the concept that current induced in the electrode is due to the instantaneous change of electrostatic flux lines that end on the electrode. The electrons transferred from the gaseous avalanche are collected by a pick-up electrode. In a strip readout, it comprises a set of parallel neutron transparent metal strips disposed on thin neutron transparent insulator ridges, and a second set of perpendicular metal strips disposed on a bottom of the ridge. A collected charge is shared between strips in the two layers; a center-of-gravity calculation provides the central avalanche coordinates in its two projections.

Beyond the high-rate neutron beam monitoring, the disclosed system is used in many other radiation type detections and rendering of images. In some alternative systems, the neutron reactive layers are replaced with other charged particle sensitive layers such as gamma ray sensitive layers that provide high rate gamma detections for beam monitoring and/or imaging. In the disclosed systems, digitized pulses from the dual threshold discriminators are processed to provide spectral information for radionuclide identification purposes, as well as temporal information (a timestamp of the event or time-of-flight of the particle) and optional parameters describing each pulse for each of the disclosed systems. The timestamp based digital data facilitates data beam monitor analysis. The disclosed systems are smaller and more efficient than other systems, are well-suited for portable detections and imaging, and are well suited for fixed location neutron beam scattering applications.

Figure 16:
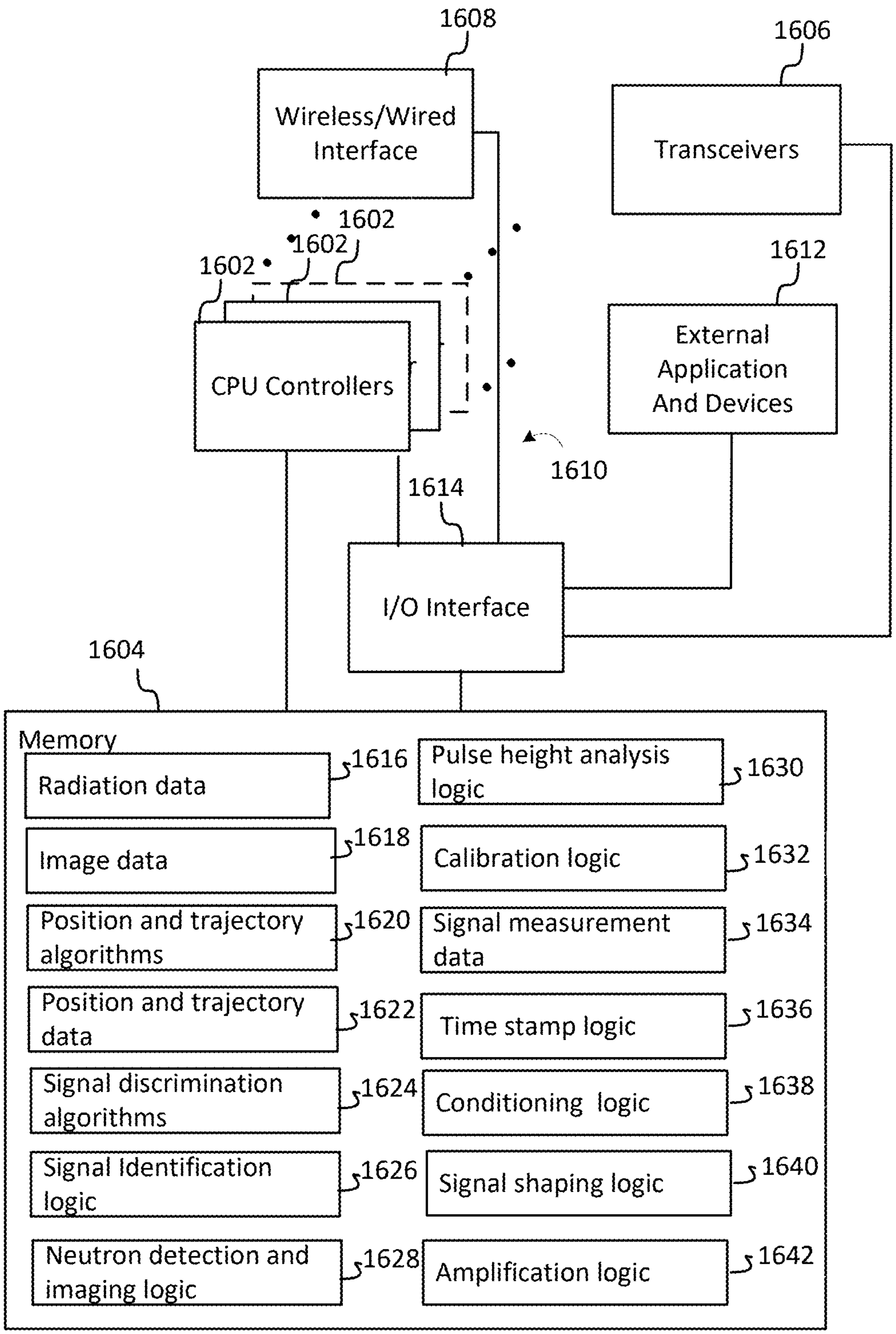
FIG. 16 is a second exemplary monitoring system.

FIG. 16 is a block diagram of the systems that execute the process flows, functions, and the systems described herein and those shown in FIGS. 1-15 and 17 and 18. The system comprises one or more central processing units or controllers (referred to as a processor) 1602 and a non-transitory machine-readable medium such as a memory and/or a cloud services 1604 (the contents of which are accessible to the processor 1602), one or more transceivers 1606, one or more wireless/wired interfaces 1608 and a physical or wireless network bus 1610 that connects to one or more external applications and devices 1612 through an input and output interface 1614. External applications and devices 1612 include systems and processes that serve radiation and energy detections, medical imaging and/or etc.

The non-transitory machine-readable medium 1604 encoded with machine-executable instructions executed by one or more processors 1602 causes the system to render some or all of the functionality associated with each of the monitoring system described herein. The memory and/or cloud services 1604 store radiation data 1616, image data 1618, position and trajectory algorithms 1620, position and trajectory data 1622, signal discrimination algorithms 1624, signal identification logic 1626, neutron detection and imaging logic 1628, pulse height analysis logic 1630, calibration logic 1632, signal measurement data 1634, time stamp logic 1636, signal conditioning logic 1638, signal shaping logic 1640, and amplification logic 1642. The term cloud and cloud system is intended to broadly encompass hardware and software that enables the systems and processes executed and data to be maintained, managed, and backed up remotely and made available to users over a network. In this system, clouds and/or cloud storage 1604 provides ubiquitous access to the system's resources that can be rapidly provisioned over a public and/or a private network at any location. Clouds and/or cloud storage 1604 allows for the sharing of resources, features, and utilities in any location to achieve coherence services.

The cloud/cloud services or memory 1604 and/or storage disclosed also retain an ordered listing of executable instructions for implementing the processes, system functions, and features described above in a non-transitory machine or computer readable code. The machine-readable medium may selectively be, but not limited to, an electronic, a magnetic, an optical, an electromagnetic, an infrared, or a semiconductor medium. A non-exhaustive list of examples of a machine-readable medium includes: a portable magnetic or optical disk, a volatile memory, such as a Random-Access Memory (RAM), a Read-Only Memory (ROM), an Erasable Programmable Read-Only Memory (EPROM) or a Flash memory, or a database management system. The cloud/cloud services and/or memory 1604 may comprise a single device or multiple devices that may be disposed on one or more dedicated memory devices or disposed within one or more processors 1602, customized circuit or other similar device. When functions, steps, etc. are "responsive to" or occur "in response to" another function or step, etc., the functions or steps necessarily occur as a result of another function or step, etc. A device or process that is responsive to another requires more than an action (i.e., the process and/or device's response to) merely follow another action. In the context of a radiation monitoring systems, the terms "cathode" and "anode" are used to describe the components of the radiation detector and their roles in detecting radiation events, such as neutron events, unless specifically associated with positive or negative charges delivered by or associated with electrochemical cells, electrical charges, or electricity. In a radiation detection context, a cathode is generally associated with a radiation detection process such as a neutron detection process, for example, while an anode generally collects the signals generated as a result radiation event such as the results of the neutron interactions, for example.

In this disclosure the term "substantially" or "about" encompasses a range that is largely in some instances, but not necessarily wholly, that which is specified. It encompasses all but a significant amount, such as what is specified or within five to ten percent. In other words, the terms "substantially" or "about" means equal to or at or within five to ten percent of the expressed value. Forms of the term "cascade" and the term itself refer to an arrangement of two or more components or layers such that the output of one component is the direct input of the next component (e.g., in a series connection). The term "real-time" and "real time" refer to responding to an event or generating objects as events occur, such as rendering a measurement in response to a detection as the detection occurs. A real time operation are those operations which match external activities and proceed at the same rate (e.g., without delay) or faster than that rate of the external activities and/or an external process. Some real-time systems operate at a faster rate as the physical element it is controlling. The term communication, in communication with, and versions of the term are intended to broadly encompass both direct and indirect communication connections. The term "unitary" refers to an indivisible entity, oneness, and singularity. It refers to a single indivisible entity or component.

Figure 17:
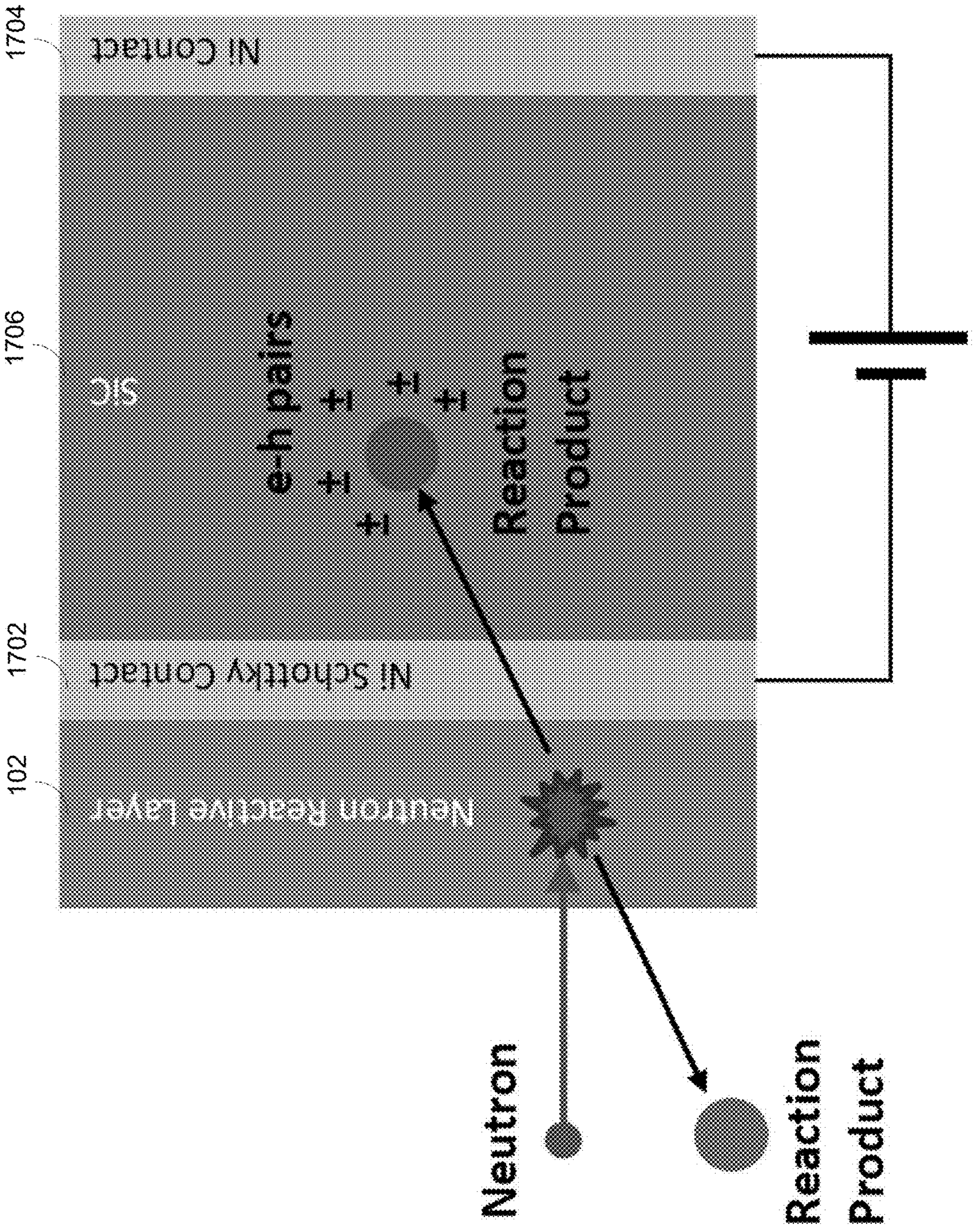
FIG. 17 is a third exemplary monitoring system.
Figure 18:
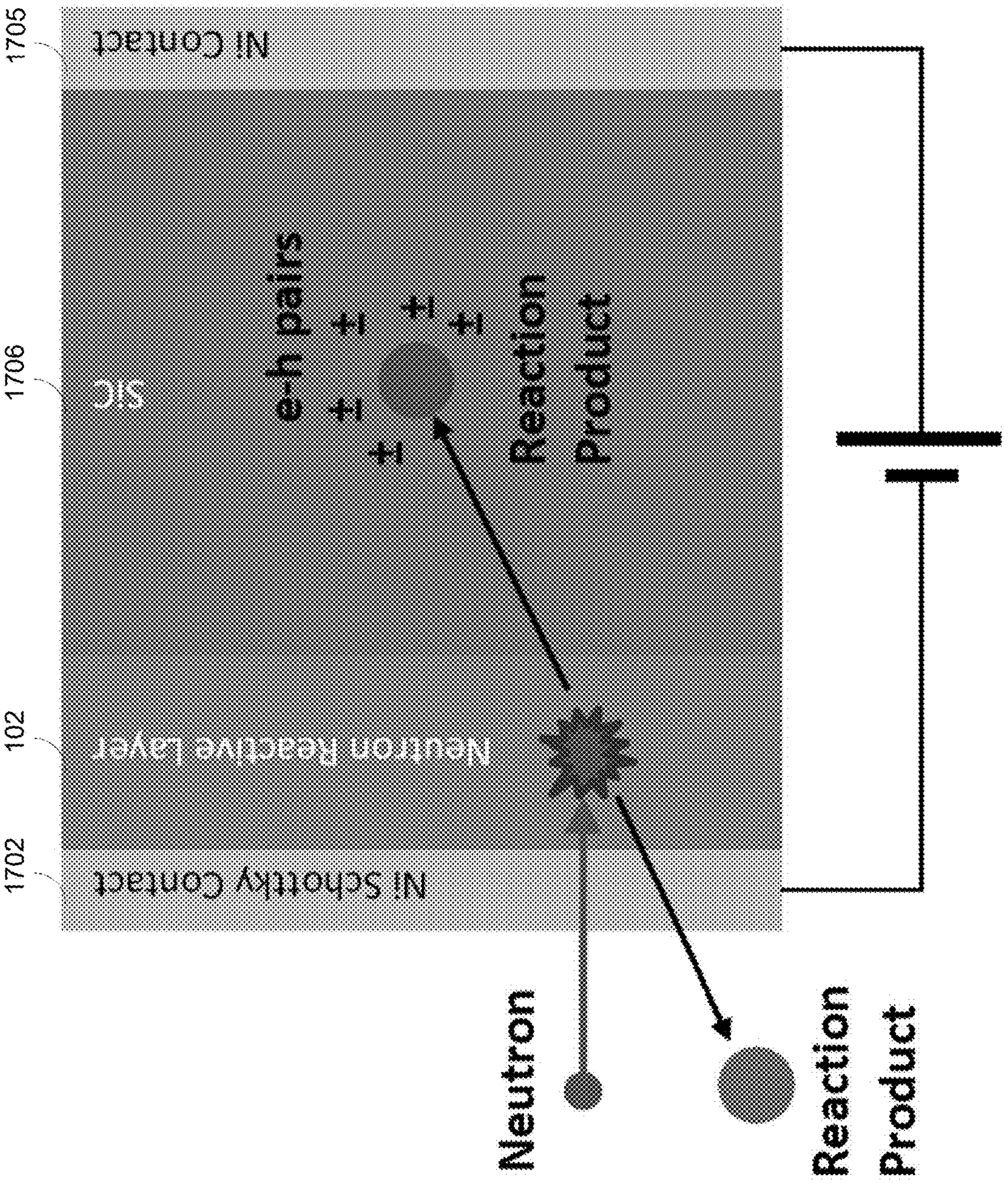
FIG. 18 is a fourth exemplary monitoring system.

The monitoring systems that render the disclosed functions herein may be practiced in the absence of any disclosed or expressed element (including the components, hardware, the software, and/or the functionality expressed), and in the absence of some or all of the described functions association with a process step or component or structure that are expressly described. The systems may operate in the absence of one or more of these components, process steps, elements and/or any subset of the expressed functions. Further, the systems may functions with additional or substitute elements and functionality, too. For example, the neutron reactive layer 102 may be disposed in front and behind a Schottky contact barrier 1702 and in front of a nickel electrode 1704 that facilitates the flow of electrical flow through a silicon carbide layer 1706 in one direction while blocking current flow in another direction as shown in FIG. 17 or 18. The disclosed silicon carbide has a high electron mobility, a wide bandgap and a high thermal conductivity allowing these alternative semiconductor based monitoring systems to operate at high temperatures and high voltage levels.

Further, the various elements and system components, and process steps described in each of the many systems and processes described herein is regarded as divisible with regard to the individual elements described, rather than inseparable as a whole. In other words, alternate systems encompass any variation and combinations of elements, components, and process steps described herein and may be made, used, or executed without the various elements described (e.g., they may operate in the absence of) including some and all of those disclosed in the prior art but not expressed in the disclosure herein. Thus, some systems do not include those disclosed in the prior art including those not described herein and thus are described as not being part of those systems and/or components and thus rendering alternative systems that may be claimed as systems and/or methods excluding those elements and/or steps.

A neutron monitoring system and method exceeds a thousand counts per second tracking capability with a sub-nanosecond time resolution. The semiconductor-based systems comprises a variety of junction types and a neutron reactive layer 102 with a low absorption efficiency of about one one-hundredth to one one-hundred-millionth incorporated in an entrance window that acts as a charged particle detector and in some system a neutron convertor. The compactness and lightweight of the detection system makes it handheld and pocket-sized and scalable to function with larger immobile systems. In another neutron monitoring system, neutron reactive layers (such as a degenerated P+ crystalline silicon) 102 serve as a cathode in a two parallel plates avalanche chamber design where neutron strikes release primary charged particles. These charged particles are converted into primary electron through a gas media and amplified by an internal gas multiplication effect for the registration of individual neutrons.

The disclosed systems may be integrated with or are unitary with detectors sensors, and analytical instrumentation. More specially, the disclosed technologies can be used in position sensing and imaging applications renders high spatial resolution and renders high counting rates. The monitoring systems can be used in neutron analysis, radiography (e.g., inspecting materials nondestructively), nuclear medicine (e.g., radiation therapy), radiation monitoring, material composition analysis, geographic analysis (e.g., determining the composition of rock formations), analytical instrumentations, and/or etc.

Other systems, methods, features and advantages will be, or will become, apparent to one with skill in the art upon examination of the figures and detailed description. It is intended that all such additional systems, methods, features, and advantages be included within this description, be within the scope of the disclosure, and be protected by the following claims.

The invention claimed is:

1. A neutron monitoring system comprising:

an entrance window located upstream of a semiconductor layer and defining a first beam-incident surface along a neutron flight path;

a neutron reactive medium that is unitary with the entrance window and produces, when struck by a neutron incident on the entrance window, a burst of charged particles that cause excitation of media along paths traveled by the charged particles;

a plurality of semiconductor junctions each sandwiched between a semiconductor junction anode electrode and a semiconductor junction cathode electrode, wherein the semiconductor junction anode electrode and the semiconductor junction cathode electrode are electrically biased, during operation of the system, to cause the semiconductor junction to be either reverse-biased or unbiased, wherein each semiconductor junction, produces, when crossed by a path traveled by a charged particle of the burst, an avalanche of electron and hole pairs, and causes the produced electrons and holes to clear the semiconductor junction in less than a nanosecond, wherein each semiconductor junction comprises a diode means generating a depletion region positioned between the semiconductor junction anode electrode and the semiconductor junction cathode electrode and adjacent the neutron reactive medium such that charged particles generated by a neutron absorption in the neutron reactive medium enter the depletion region, the depletion region having a thickness selected such that, under an applied electrical bias, the electrons and holes drift to the semiconductor junction anode electrode and the semiconductor junction cathode electrode, respectively, in less than a nanosecond, thereby sourcing an electrical current pulse between the semiconductor junction anode electrode and the semiconductor junction cathode electrode, the sourced electrical current pulse corresponding to the burst of charged particles produced by the neutron that struck the neutron reactive medium; and where the plurality of semiconductor functions coupled to the neutron reactive medium has an absorption efficiency in a range from about $10^{-1}$ to $10^{-8}$; and a neutron registration circuit electrically coupled with the plurality of semiconductor junctions, wherein the neutron registration circuit amplifies and conditions the electrical current pulses that are sourced through the semiconductor junctions' anode and cathode electrodes to record neutron-beam intensity measurements and neutron-beam localization measurements.

2. The system of claim 1 where the neutron reactive medium comprises a boron-doped monolayer.

3. The system of claim 1 where the neutron reactive medium comprises about a one-micron thick lithium-based layer.

4. The system of claim 1 where the neutron reactive medium comprises a sub micrometer thick reactive film.

5. The system of claim 1 where the neutron reactive medium has a neutron absorption efficiency of about one millionth.

6. The system of claim 1 where one of the plurality of semiconductor junctions comprises a metal in physical contact with a semiconductor material.

7. The system of claim 1 where one of the plurality of semiconductor junctions comprises a semiconductor material comprising a same material, a same charge type, and a different doping level.

8. The system of claim 1 where one of the plurality of semiconductor junctions is formed of two or more different materials having a different charge type.

9. The system of claim 1 where the plurality of semiconductor junctions comprise a P-type and an I-type junction and an N-type and an I-type junction.

10. The system of claim 1 further comprising a pixel readout circuit in communication with the neutron registration circuit configured to display a neutron intensity pattern, a neutron beam localization, or a neutron beam profile.

11. The system of claim 1 further comprising a strip readout in communication with the neutron registration circuit configured to display a neutron intensity pattern, a neutron beam localization, or a neutron beam profile.

12. The system of claim 1 further comprising a delay line readout in communication with the neutron registration circuit configured to display a neutron intensity pattern, a neutron beam localization, or a neutron beam profile.

13. The system of claim 1 where the neutron monitoring system comprises a handheld portable device.

14. The system of claim 1 where the neutron monitoring system comprises a fixed location instrumentation.

15. A neutron monitoring system comprising:

an entrance window located upstream of a semiconductor layer and defining a first beam-incident surface along a neutron flight path;

a neutron reactive medium having a thickness of one micrometer that is unitary with the entrance window and that has a neutron absorption rate, for a neutron incident on the entrance window, ranging from about one-tenth to about one-hundred-millionth of incident neutrons, and that produces, when struck by an absorbed neutron, a burst of charged particles that cause excitation of media along paths traveled by the charged particles;

a plurality of semiconductor junctions each sandwiched between a semiconductor junction anode electrode and a semiconductor junction cathode electrode, wherein the semiconductor junction anode electrode and the semiconductor cathode electrode are electrically biased, during operation of the system, to cause one of the semiconductor junction to be either reverse-biased or unbiased, wherein each semiconductor junction, produces, when crossed by a path traveled by a charged particle of the burst, an avalanche of electron and hole pairs, and causes the produced electrons and holes to clear the semiconductor junction in less than a nanosecond, wherein each semiconductor junction comprises a Silicon Carbide Schottky diode generating a depletion region positioned between the semiconductor junction anode electrode and the semiconductor junction cathode electrode and directly adjacent the neutron reactive medium such that charged particles generated by a neutron absorption in the neutron reactive medium enter the depletion region, the depletion region having a thickness selected such that, under an applied electrical bias, the electrons and holes drift to the semiconductor junction anode electrode and the semiconductor junction cathode electrode, respectively, in less than a nanosecond, thereby sourcing an electrical current pulse between the semiconductor junction anode electrode and the semiconductor junction cathode electrode, the sourced electrical current pulse corresponding to the burst of charged particles produced by the neutron that struck the neutron reactive medium;

where the plurality of semiconductor junctions coupled to the neutron reactive medium has an absorption efficiency in a range from about $10^{-1}$ to $10^{-8}$; and a neutron registration circuit electrically coupled with the plurality of semiconductor junctions, wherein the neutron registration circuit amplifies and conditions the electrical current pulses that are sourced through the semiconductor junction anode and the semiconductor junction cathode electrodes to record neutron-beam intensity measurements and neutron-beam localization measurements; and a processor that renders a two-dimensional image of radiation sources in real time and renders spectral data comprising a time-of-flight of the neutron incident and a plurality of pulse parameters.

* * * * *